(12) United States Patent
Oh et al.

(10) Patent No.: US 11,662,782 B2
(45) Date of Patent: May 30, 2023

(54) ELECTRONIC DEVICE

(71) Applicants: SAMSUNG DISPLAY CO., LTD., Yongin-si (KR); Seoul National University R&DB Foundation, Seoul (KR)

(72) Inventors: Jungsuek Oh, Seoul (KR); Sangrock Yoon, Hwaseong-si (KR); Kiseo Kim, Yongin-si (KR); Byeongjin Kim, Gumi-si (KR); Jeongtaek Oh, Seoul (KR)

(73) Assignees: SAMSUNG DISPLAY CO., LTD., Yongin-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/365,017

(22) Filed: Jul. 1, 2021

(65) Prior Publication Data
US 2022/0147115 A1 May 12, 2022

(30) Foreign Application Priority Data
Nov. 6, 2020 (KR) .................. 10-2020-0147846

(51) Int. Cl.
*G06F 1/16* (2006.01)
*H01Q 1/24* (2006.01)
(Continued)

(52) U.S. Cl.
CPC .......... *G06F 1/1698* (2013.01); *G06F 3/0412* (2013.01); *H01Q 1/2266* (2013.01); *H01Q 1/243* (2013.01)

(58) Field of Classification Search
CPC ... G06F 3/0412; G06F 1/1698; H01Q 1/2266; H01Q 1/243
(Continued)

(56) References Cited

U.S. PATENT DOCUMENTS

2012/0170284 A1* 7/2012 Shedletsky ........... G01J 1/0407
362/355
2016/0266690 A1* 9/2016 Ahn ....................... G06F 1/1637
(Continued)

FOREIGN PATENT DOCUMENTS

JP 2006-048166 2/2006
KR 10-1973742 4/2019
(Continued)

OTHER PUBLICATIONS

Park, et al., "An Optically Invisible Antenna-on-Display (AoD) Concept for Millimeter-Wave 5G Cellular Devices", in IEEE Transactions on Antennas and Propagation, vol. 67, No. 5, pp. 2942-2952, May 2019, doi: 10.1109/TAP.2019.2900399.
(Continued)

*Primary Examiner* — Prabodh M Dharia
(74) *Attorney, Agent, or Firm* — F. Chau & Associates, LLC

(57) ABSTRACT

An electronic device includes a display layer, a sensor layer, a cover layer, and a driving chip. The display layer includes a peripheral area adjacent to an active area. The sensor layer is on the display layer and includes sensing electrodes and an antenna pattern. The cover layer is below the display layer and includes an opening overlapping the antenna pattern. The driving chip provides a signal to the antenna pattern through the opening in the cover layer.

21 Claims, 17 Drawing Sheets

(51) Int. Cl.
  *H01Q 1/22*   (2006.01)
  *G06F 3/041*  (2006.01)
(58) Field of Classification Search
  USPC .......................................... 345/156; 362/355
  See application file for complete search history.

(56) References Cited

U.S. PATENT DOCUMENTS

| | | | |
|---|---|---|---|
| 2017/0142837 A1* | 5/2017 | Kim | H04M 1/0266 |
| 2018/0149920 A1* | 5/2018 | Yamazaki | G02F 1/1343 |
| 2020/0076035 A1 | 3/2020 | Huh et al. | |
| 2020/0083595 A1 | 3/2020 | Cai et al. | |
| 2020/0227819 A1* | 7/2020 | Oh | H04M 1/026 |
| 2020/0266526 A1 | 8/2020 | Choi et al. | |
| 2021/0013626 A1* | 1/2021 | Jang | H01Q 1/38 |
| 2021/0200379 A1* | 7/2021 | Youk | G06F 3/0412 |

FOREIGN PATENT DOCUMENTS

| | | |
|---|---|---|
| KR | 10-2028352 | 10/2019 |
| KR | 10-2020-0005010 | 1/2020 |
| KR | 10-2093326 | 3/2020 |

OTHER PUBLICATIONS

Gaya, et al., "A Wideband Dielectric Resonator Antenna with a C shaped Slot Aperture for 5G Applications", 2018 IEEE International RF and Microwave Conference (RFM), Penang, Malaysia, 2018, pp. 258-261, doi: 10.1109/RFM.2018.8846469.

* cited by examiner

ELECTRONIC DEVICE

CROSS-REFERENCE TO RELATED APPLICATIONS

This U.S. non-provisional patent application claims priority under 35 U.S.C. § 119 of Korean Patent Application No. 10-2020-0147846, filed on Nov. 6, 2020, the entire contents of which are incorporated by reference herein.

BACKGROUND

1. Field of the Disclosure

One or more embodiments herein relate to an electronic device including a display.

2. Description of the Related Art

A variety of electronic devices have been developed. Some are portable and others are even wearable. As the size of these devices trends toward miniaturization, the space to accommodate the internal electronic circuits decreases. This presents design challenges, which are exacerbated by an ever-increasing demand for greater numbers of features and functionality.

SUMMARY

One or more embodiments described herein provide an electronic device having improved display and/or sensing performance.

In accordance with one or more embodiments, an electronic device includes a display layer including a peripheral area adjacent to an active area, a sensor layer on the display layer and comprising a plurality of sensing electrodes and an antenna pattern, a cover layer disposed below the display layer and including an opening overlapping the antenna pattern, and a driving chip configured to provide a signal to the antenna pattern through the cover layer opening.

In accordance with one or more embodiments, an electronic device includes a display layer including a peripheral area adjacent to an active area, the display layer comprising a second surface facing a first surface, a sensor layer facing the first surface and comprising an antenna pattern overlapping the active area, a cover layer facing the second surface and including an opening overlapping the active area, and a driving chip disposed below the cover layer and configured to indirectly supply power to the antenna pattern through the opening.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1A:
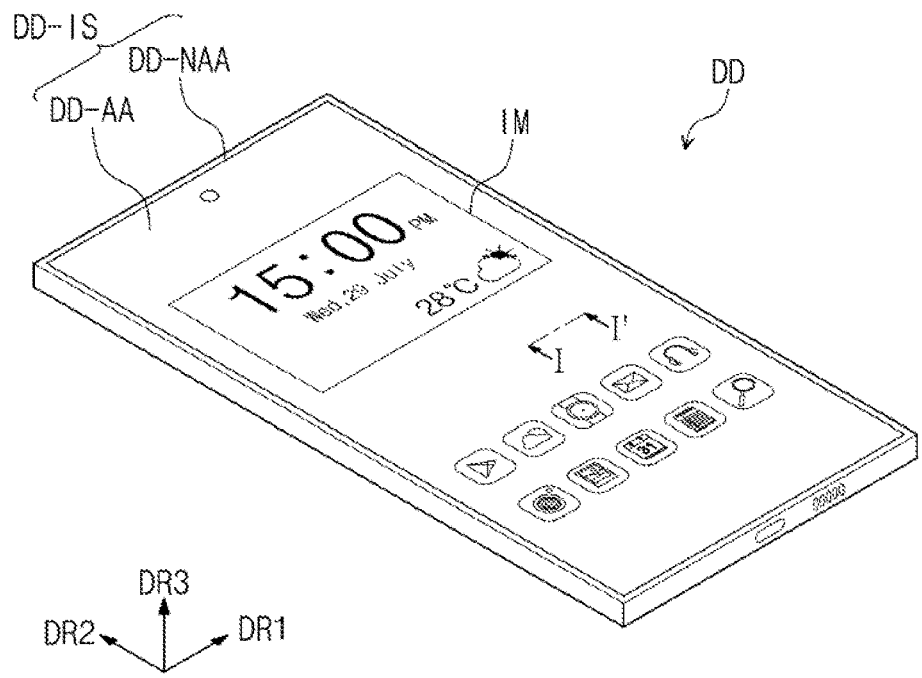
FIG. 1A illustrates an embodiment of an electronic device.

In this specification, it will also be understood that when one component (or area, layer, portion) is referred to as being "on", "connected to", or "coupled to" another component, it can be directly disposed/connected/coupled on/to the one component, or an intervening third component may also be present. Like reference numerals refer to like elements throughout. Also, in the figures, the thickness, ratio, and dimensions of components are exaggerated for clarity of illustration. The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in an embodiment can be referred to as a second element in another embodiment without departing from the scope of the appended claims. The terms of a singular form may include plural forms unless referred to the contrary. Also, "under", "below", "above', "upper", and the like are used for explaining relation association of components illustrated in the drawings The terms may be a relative concept and described based on directions expressed in the drawings.

Unless otherwise defined, terms (including technical and scientific terms) used herein have the same meaning as commonly understood by a person of ordinary skill in the art to which this invention belongs. Also, terms such as defined terms in commonly used dictionaries are to be interpreted as having meaning consistent with meaning in context of the relevant art and are expressly defined herein unless interpreted in an ideal or overly formal sense.

The meaning of "include" or "comprise" specifies a property, a fixed number, a step, an operation, an element, a component or a combination thereof, but does not exclude other properties, fixed numbers, steps, operations, elements, components or combinations hereof.

Hereinafter, embodiments of the inventive concept will be described with reference to the accompanying drawings.

Figure 1B:
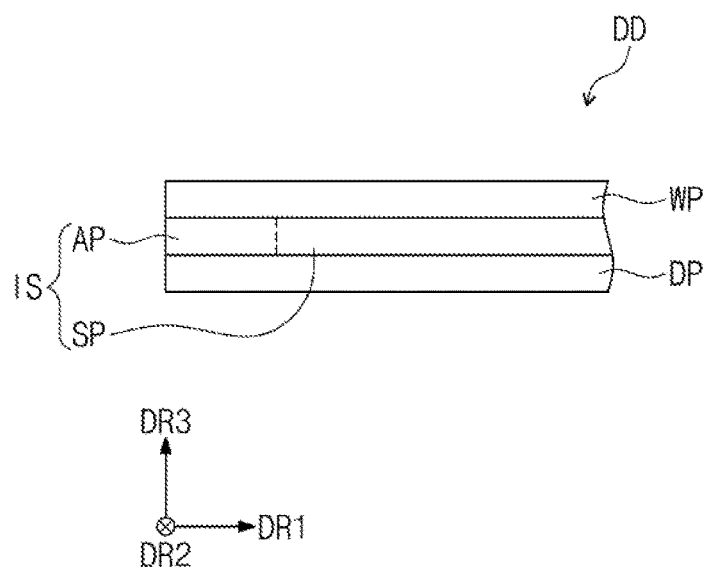
FIG. 1B is a cross-sectional view of the electronic device of FIG. 1A according to an embodiment of the inventive concept.

FIG. 1A is a perspective view of an electronic device DD according to an embodiment of the inventive concept, and FIG. 1B is a cross-sectional view of the electronic device DD according to an embodiment of the inventive concept.

Referring to FIGS. 1A and 1B, an electronic device DD may be a device that is activated according to an electrical signal. For example, the electronic device DD may be a mobile phone, a tablet PC, a car navigation system, a game console, or a wearable device, but is not limited thereto. FIG. 1A illustrates an example in which the electronic device DD is provided as the mobile phone.

The electronic device DD may display an image IM through a display surface DD-IS. The display surface DD-IS may include an active area DD-AA and a peripheral area DD-NAA adjacent to the active area DD-AA. The active area DD-AA may display an image IM, which, for example, may be a dynamic image (e.g., video) or a still image. The peripheral area DD-NAA may not display an image IM. FIG. 1 illustrates a watch window and an icon as examples of the image IM.

The active area DD-AA may be parallel to a surface extending in a first direction DR1 and a second direction DR2 crossing the first direction DR1. A normal direction of the active area DD-AA (e.g., a thickness direction of the electronic device DD) is indicated as a third direction DR3.

A front surface (or a top surface) and a rear surface (or a bottom surface) of each of members or parts may be distinguished from each other by the third direction DR3. The third direction DR3 may be a direction crossing the first direction DR1 and the second direction DR2. For example, the first direction DR1, the second direction DR2, and the third direction DR3 may cross each other. Also, in one embodiment a surface defined by the first direction DR1 and the second direction DR2 may correspond to a plane, and the expression "plan view" may indicate viewing features in the third direction DR3.

The electronic device DD may include a display layer DP, a sensor layer IS, and a window WP. The display layer DP may generate light of the image IM and, for example, may be an emission-type display layer. However, embodiments of the inventive concept is not limited thereto. The display layer DP may include, for example, an organic light emitting display layer, a quantum dot display layer, a micro LED display layer, or a nano LED display layer.

The sensor layer IS may be on the display layer DP, for example, using a continuous process. In one embodiment, the sensor layer IS may be bonded to the display layer DP through an adhesive. The adhesive may include, for example, a common adhesive or an adhesive agent. In one embodiment, the adhesive may be a transparent adhesive such as a pressure sensitive adhesive film (PSA), an optically clear adhesive film (OCA), or an optically clear resin (OCR).

A sensing area SP and an antenna area AP may be on the sensor layer IS. Sensing sensors for sensing an external input may be on the sensing area SP. The external input may be, for example, a user input. Examples of a user input include ones generated by a body part, light, heat, a pen, or a pressure. When viewed in a plan view, the sensing area SP may overlap the active area DD-AA.

An antenna pattern for transmitting, receiving, or transmitting/receiving a plurality of wireless communication signals (e.g., radio frequency (RF) signals) may be disposed on the antenna area AP. The antenna area AP may be adjacent to an outer portion of the sensing area SP. In one embodiment, a plurality of antenna areas AP may be provided. In this case, the antenna areas AP may extend, for example, from at least two sides of the sensing area SP, respectively. The sensor layer IS may include one sensing area SP and one or more and four or less antenna areas AP. However, this is merely an example. The sensing area SP and antenna area AP according to an embodiment of the inventive concept are not limited thereto.

When viewed in a plan view, at least a portion of the antenna area AP may overlap the active area DD-AA. Even when the electronic device DD is reduced, miniaturized or thinned or a surface area of the peripheral area DD-NAA is reduced, sufficient space may be provided to accommodate the antenna area(s) AP because the surface area(s) of the active area DD-AA is secured. The antenna area AP may be formed, for example, when the sensing area SP is formed and/or using substantially a same process. However, this is merely an example. According to an embodiment of the inventive concept, the antenna area AP may be formed by a process different from that for forming the sensing area SP and/at different times.

The window WP may be on the sensor layer IS and, for example, may include an optically transparent insulating material, e.g., glass or plastic. The window WP may have a single-layered or multilayered structure. For example, the window WP may include a plurality of plastic films bonded to each other using an adhesive or may include a glass substrate and a plastic film, which are bonded to each other using an adhesive.

Figure 2A:
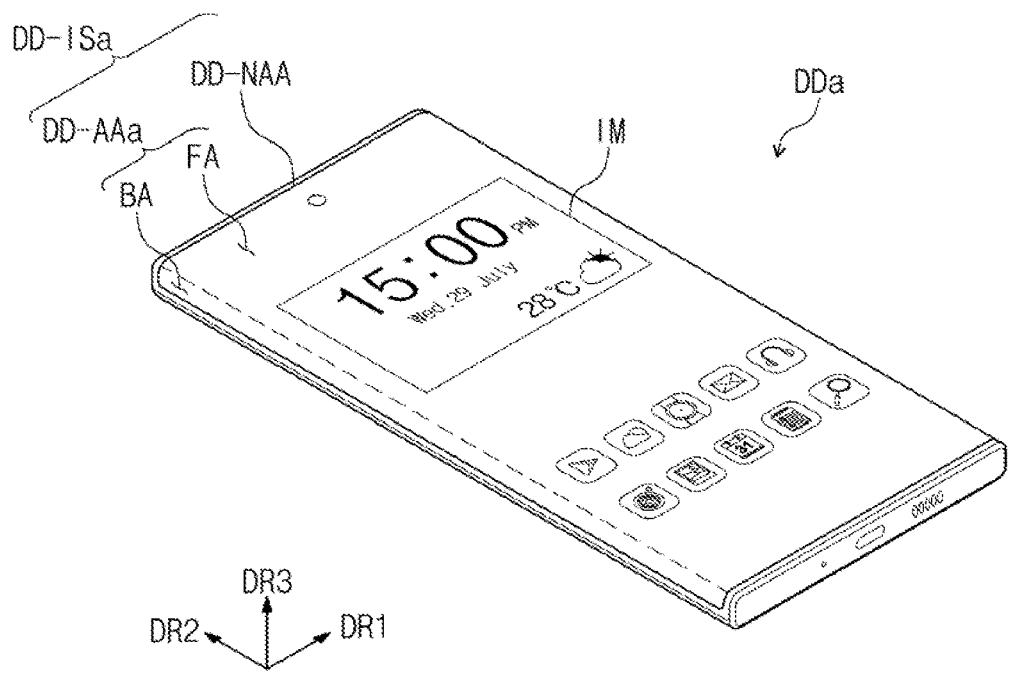
FIG. 2A illustrates an embodiment of an electronic device.
Figure 2B:
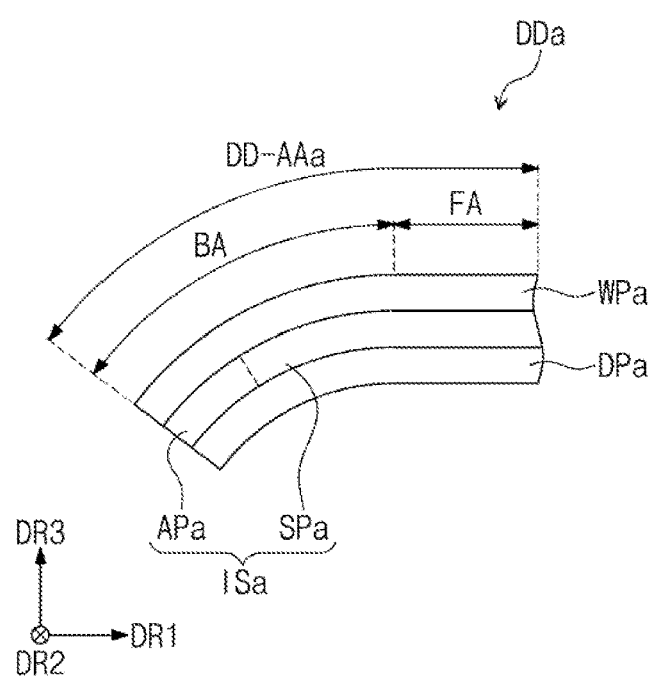
FIG. 2B is a cross-sectional view of the electronic device of FIG. 2A according to an embodiment of the inventive concept.

FIG. 2A is a perspective view of an electronic device according to an embodiment of the inventive concept, and FIG. 2B is a cross-sectional view of the electronic device according to an embodiment of the inventive concept. In description of FIGS. 2A and 2B, like reference numerals may be used for like components of FIGS. 1A and 1B.

Referring to FIGS. 2A and 2B, an electronic device DDa may display an image IM through a display surface DD-ISa, which, for example, may include an active area DD-AAa and a peripheral area DD-NAA adjacent to the active area DD-AAa.

The active area DD-AAa may include a first active area FA and a second active area BA bent from the first active area FA. In one embodiment, a plurality of second active areas BA may be provided. In this case, each of the second active areas BA may be provided by being bent from at least two sides of the first active area FA. The active area DD-AAa may include one first active area FA and one or more and four or less second active areas BA. However, According to an embodiment of the inventive concept, the active area DD-AAa may have a different number of active areas FA and/or BA in another embodiment.

The electronic device DDa may include a display layer DPa, a sensor layer ISa, and a window WPa. The display layer DPa overlapping the second active area BA may be bent. A sensing area SPa and an antenna area APa may be on the sensor layer ISa. When viewed in a plan view, the sensing area SPa may overlap a portion of each of the first active area FA and the second active area BA. The antenna area APa may overlap the other portion of the second active area BA.

Figure 3:
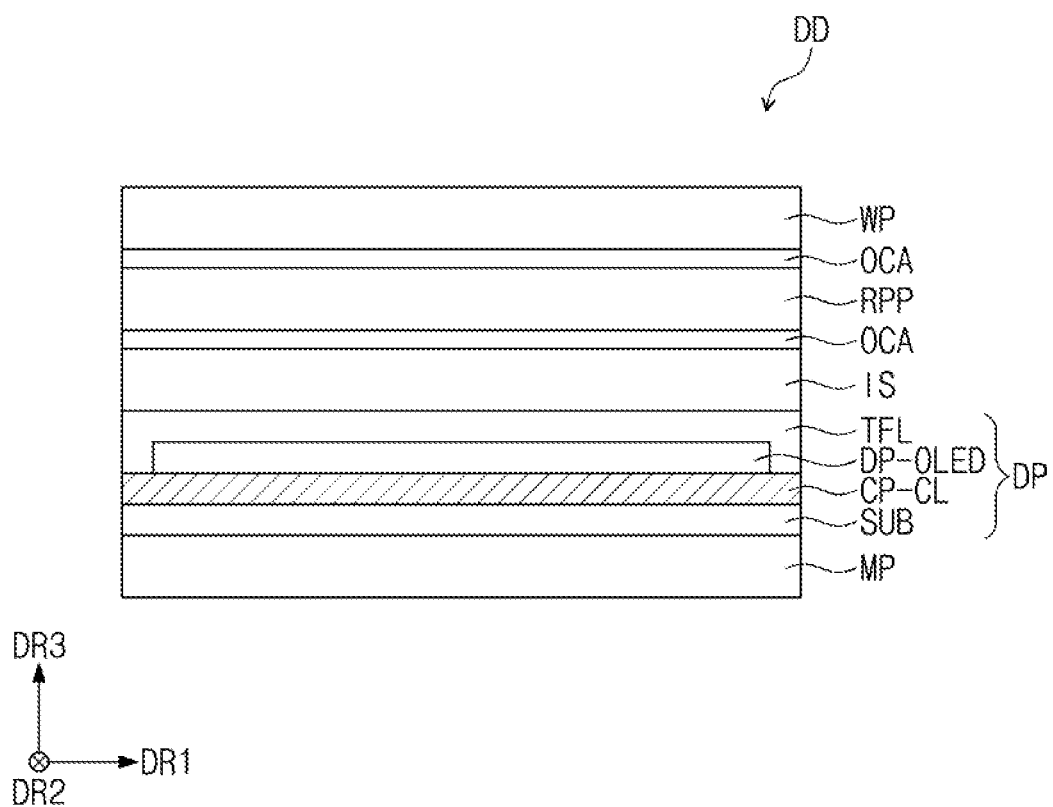
FIG. 3 illustrates an electronic device according to an embodiment of the inventive concept.

FIG. 3 is a schematic cross-sectional view of electronic device DD according to an embodiment of the inventive concept. Referring to FIG. 3, the electronic device DD may include a window WP, an adhesive layer OCA, an anti-reflection layer RPP, a sensor layer IS, a display layer DP, and a cover layer MP.

The window WP may correspond to an outer appearance of electronic device DD and may protect internal components of the electronic device DD from external impact, and may also substantially provide a display surface DD-IS (e.g., see FIG. 1A) of electronic device DD.

The adhesive layer OCA may be below the window WP, and the window WP and the anti-reflection layer RPP may be bonded to each other by the adhesive layer OCA. The adhesive layer OCA may include one or more adhesives or one or more sensitive agents. For example, the adhesive layer OCA may include an optically clear adhesive film, an optically clear adhesive resin, or a pressure sensitive adhesive film.

The anti-reflection layer RPP may be below the window WP and may reduce reflectance of natural light (or sunlight) incident from an upper side of the window WP. According to an embodiment of the inventive concept, the anti-reflection layer RPP may include a retarder and a polarizer. The retarder may be a film-type or liquid crystal coating-type retarder and may include a $\lambda/2$ retarder and/or a $\lambda/4$ retarder. The polarizer may be provided in a film-type or liquid crystal coating-type polarizer. The film-type may include an elongation-type synthetic resin, and the liquid crystal coating type may include liquid crystals arranged in a predetermined arrangement. Each of the retarder and the polarizer may further include a protection film. The retarder and polarizer itself or the protection film may be defined as a base layer of the anti-reflection layer RPP.

The adhesive layer OCA may be below the anti-reflection layer RPP. The anti-reflection layer RPP and sensor layer IS may be bonded to each other by adhesive layer OCA.

The display layer DP may be below the sensor layer IS and may include a base layer SUB, a display circuit layer DP-CL, an image implementation layer DP-OLED, and a thin film encapsulation layer TFL.

The cover layer MP may be below the display layer DP, may block noise generated in the display layer DP, and may assist dissipation of heat. In addition, the cover layer MP may block electromagnetic waves. For example, the cover layer MP may be a metal sheet, e.g., a copper (Cu) sheet. However, this is merely an example. For example, the cover layer MP may include various layers. In one embodiment, the cover layer MP may include one or more graphite sheets. The cover layer MP may have an opening OP-MP (e.g., see FIG. 8) through a signal transmitted from a waveguide is emitted. The opening OP-MP (e.g., see FIG. 8) will be described later.

Figure 4A:
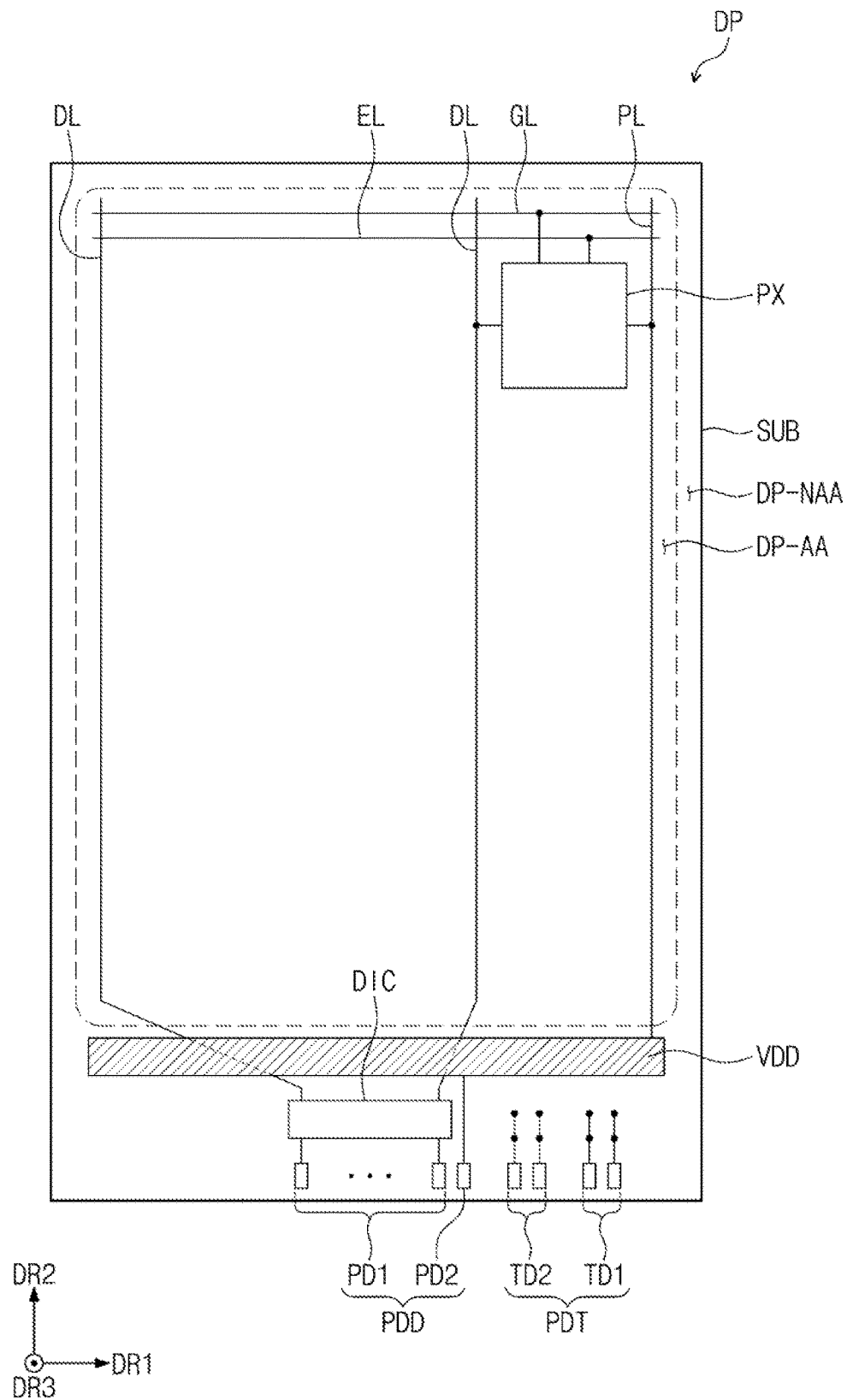
FIG. 4A illustrates an embodiment of a display layer.

FIG. 4A is a plan view of the display layer according to an embodiment of the inventive concept. Referring to FIG. 4A, an active area DP-AA and a peripheral area DP-NAA adjacent to the active area DP-AA may be on the display layer DP. The active area DP-AA may be an area on which an image IM (e.g., see FIG. 1A) is displayed. A plurality of pixels PX may be on the active area DP-AA. The peripheral area DP-NAA may include one or more driving circuits and/or one or more driving lines. When viewed in a plan view, the active area DP-AA may overlap the active area DD-AA of the electronic device DD (e.g., see FIG. 1A) or the active area DD-AAa of the electronic device DDa (e.g., see FIG. 2a), and the peripheral area DP-NAA may overlap the peripheral area DD-NAA (e.g., see FIGS. 1A and 2A).

The display layer DP may include a base layer SUB, a plurality of pixels PX, a plurality of signal lines GL, DL, PL, and EL, a plurality of display pads PDD, and a plurality of sensing pads PDT. Each of the pixels PX may display one of primary colors or one of mixed colors. The primary colors may, for example, include a red, green, or blue color. The mixed colors may include, for example, various colors such as white, yellow, cyan, or magenta. However, the embodiment of the inventive concept is not limited to these colors displayed by the pixels PX.

A plurality of signal lines GL, DL, PL, and EL may be on the base layer SUB and may be connected to the plurality of pixels PX, to transmit electrical signals to the pixels PX. The signal lines GL, DL, PL, and EL include a plurality of scan lines GL, a plurality of data lines DL, a plurality of power lines PL, and a plurality of emission control lines EL. However, this is merely an example, and the configurations of the signal lines GL, DL, PL, and EL according to an embodiment of the inventive concept is not limited thereto. For example, according to an embodiment of the inventive concept, the signal lines GL, DL, PL, and EL may further include an initialization voltage line.

The power pattern VDD may be on the peripheral area DP-NAA and may be connected to the plurality of power lines PL. Since the display layer DP includes power pattern VDD, the same (or substantially the same) power signal may be provided to the pixels PX according to one embodiment.

The display pads PDD may be on the peripheral area NAA and may include a first pad PD1 and a second pad PD2. In one embodiment, a plurality of first pads PD1 may be provided. The first pads PD1 may be connected to the data lines DL, respectively. The second pad PD2 may be connected to the power pattern VDD and electrically connected to the power line PL. The display layer DP may provide electrical signals provided from an external source to the pixels PX through the display pads PDD. The display pads PDD may further include pads for receiving other electrical signals in addition to the first pad PD1 and the second pad PD2, but are not limited to a specific embodiment.

The driving circuit DIC may be mounted on the peripheral area DP-NAA and may operate as a timing control circuit in the form of a chip. The data lines DL may be electrically connected to the first pads PD1 through the driving circuit DIC, respectively. However, this is merely an example. According to the embodiment of the inventive concept, the driving circuit DIC may be mounted on a film separate from the display layer DP. In this case, the driving circuit DIC may be electrically connected to the display pads PDD through the film.

The sensing pads PDT may be disposed on the peripheral area DP-NAA and may be electrically connected to a plurality of sensing electrodes of the sensor layer IS (e.g., see FIG. 3). The sensing pads PDT may include a plurality of first sensing pads TD1 and a plurality of second sensing pads TD2.

Figure 4B:
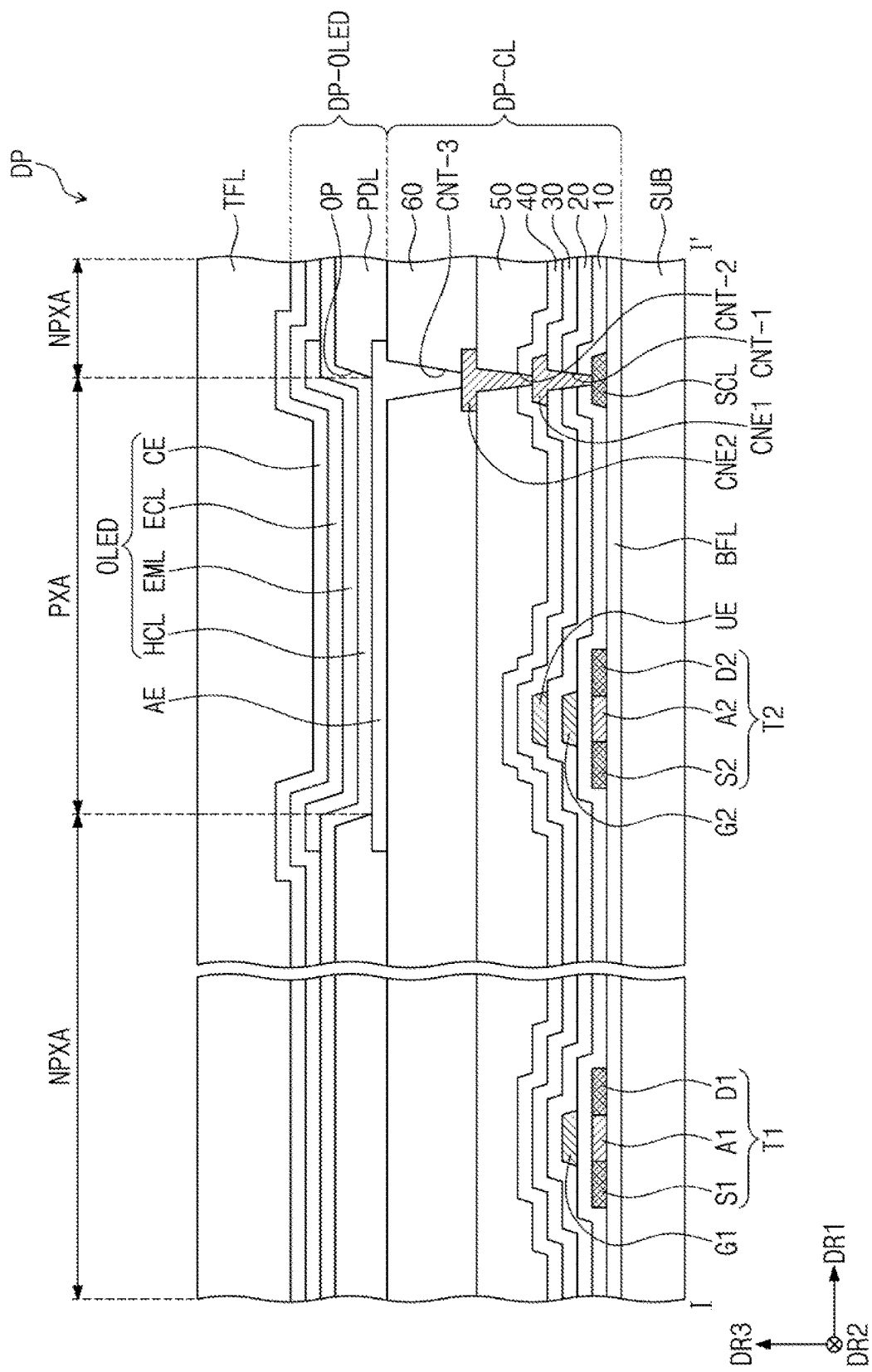
FIG. 4B is a cross-sectional view taken along line I-I' of FIG. 1A according to an embodiment of the inventive concept.

FIG. 4B is a cross-sectional view taken along line I-I' of FIG. 4A according to an embodiment of the inventive concept. Referring to FIG. 4B, the display layer DP may include a base layer SUB, a display circuit layer DP-CL, an image realization layer DP-OLED, and a thin film encapsulation layer TFL. The display layer DP may include a plurality of insulating layers, a semiconductor pattern, a conductive pattern, a signal line, and the like. The insulating layer, the semiconductor layer, and the conductive layer may be formed in a manner such as coating or vapor deposition. Thereafter, the insulating layer, the semiconductor layer, and the conductive layer may be selectively patterned in a photolithography manner. In this way, the semiconductor patterns, the conductive pattern, the signal line, and the like, which are provided in the display circuit layer DP-CL and the image realization layer DP-OLED may be formed. The base layer SUB may be a base substrate supporting the display circuit layer DP-CL and the image realization layer DP-OLED.

The base layer SUB may include a synthetic resin layer and, for example, may contain a thermosetting resin. In one embodiment, the base layer SUB may have a multilayered structure. For example, the base layer SUB may include a first synthetic resin layer, a silicon oxide (SiOx) layer on the first synthetic resin layer, an amorphous silicon (a-Si) layer on the silicon oxide layer, and a second synthetic resin layer on the amorphous silicon layer. The silicon oxide layer and the amorphous silicon layer may be referred to as a base barrier layer.

Each of the first and second synthetic resin layers may include a polyimide-based resin. Also, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. In this specification, the material-based resins mentioned herein may correspond to a functional group of the stated materials. In one embodiment, the base layer SUB may include a glass substrate or an organic/inorganic composite substrate.

At least one inorganic layer may be disposed on a top surface of the base layer SUB. The inorganic layer may include at least one of oxide, titanium oxide, silicon oxide, silicon oxide nitride, zirconium oxide, or hafnium oxide. The inorganic layer may be provided as a multilayer. The multilayered inorganic layer may include a barrier layer and/or a buffer layer. In this embodiment, the display layer DP may include the buffer layer BFL.

The display circuit layer DP-CL may be disposed on the base layer SUB and may provide signals for driving light emitting elements OLED provided in the image realization layer DP-OLED. The display circuit layer DP-CL may include the buffer layer BFL, a first transistor T1, a second transistor T2, a first insulating layer 10, a second insulating layer 20, and a third insulating layer 30, a fourth insulating layer 40, a fifth insulating layer 50, and a sixth insulating layer 60.

The buffer layer BFL may improve bonding force between the base layer SUB and the semiconductor pattern. The buffer layer BFL may include a silicon oxide layer and a silicon nitride layer. In one embodiment, the silicon oxide layer and the silicon nitride layer may be alternately laminated. A semiconductor pattern may be disposed on the buffer layer BFL and, for example, may include polysilicon, amorphous silicon, metal oxide or another material.

FIG. 4B illustrates a portion of the semiconductor pattern. The semiconductor pattern may be disposed, for example, on other areas of the pixel PX on the plane. The semiconductor pattern may be arranged in a specific rule over the pixels PX. The semiconductor pattern has different electrical properties depending on whether the semiconductor pattern is doped. The semiconductor pattern may include a first region having high conductivity and a second region having low conductivity. The first region may be doped with an N-type dopant or a P-type dopant. A P-type transistor may include a doped region doped with the P-type dopant, and an N-type transistor may include a doped region doped with the N-type dopant. The second region may be a non-doped region or may be doped at a concentration less than that of the first region.

The first region may have conductivity greater than that of the second region and may serve as an electrode or a signal line. The second region may substantially correspond to an active (or channel) of the transistor. For example, a portion of the semiconductor pattern may be an active area of the transistor, other portion(s) may be source/drain region(s) of the transistor, and another portion may be a connection electrode or a connection signal line.

Each of the pixels PX (e.g., see FIG. 4A) may, for example, have an equivalent circuit including seven transistors, one capacitor, and a light emitting element, and an equivalent circuit diagram of the pixel may be modified in various forms. In FIG. 4B, the two transistors T1 and T2 and the light emitting element OLED (which are provided in each of the pixels PX, e.g., see FIG. 4A) are exemplarily illustrated. The first transistor T1 may include a source S1, an active A1, a drain D1, and a gate G1. The second transistor T2 may include a source S2, an active A2, a drain D2, a gate G2, and an upper electrode UE.

The source S1, the active A1, and the drain D1 of the first transistor T1 may be formed from the semiconductor pattern. Also, the source S2, the active A2, and the drain D2 of the second transistor T2 may be formed from the semiconductor pattern. The sources S1 and S2 and the drains D1 and D2 may extend from the actives A1 and A2 in directions opposite to each other. FIG. 4B illustrates a portion of a connection signal line SCL formed from the semiconductor pattern. The connection signal line SCL may be electrically connected to the drain D2 of the second transistor T2 on the plane.

A first insulating layer 10 may be disposed on the buffer layer BFL and may commonly overlap the pixels PX and may cover the semiconductor pattern. The first insulating layer 10 may include an inorganic layer and/or an organic layer and have a single-layered or multilayered structure. The first insulating layer 10 may include at least one of oxide, titanium oxide, silicon oxide, silicon oxide nitride, zirconium oxide, or hafnium oxide. In this embodiment, the first insulating layer 10 may include a single-layered silicon oxide layer. The insulating layer of the circuit element layer DP-CL and the first insulating layer 10 may be an inorganic layer and/or an organic layer and may have a single-layered or a multilayered structure. The inorganic layer may include at least one of the above-described materials.

Gates G1 and G2 may be disposed on the first insulating layer 10. Each of the gates G1 and G2 may be a portion of the metal pattern. The gates G1 and G2 may overlap the active areas A1 and A2. In the process of doping the semiconductor pattern, the gates G1 and G2 may serve as masks.

A second insulating layer 20 may be disposed on the first insulating layer 10 and may cover the gates G1 and G2. The second insulating layer 20 may commonly overlap the plurality of pixels PX. The second insulating layer 20 may be an inorganic layer and/or an organic layer and have a single-layered or multilayered structure. In this embodiment, the first insulating layer 20 may include a single-layered silicon oxide layer.

The upper electrode UE may be disposed on the second insulating layer 20 and may overlap the gate G2. The upper electrode UE may be a portion of the metal pattern. In one embodiment, a portion of the gate G2 and the upper electrode UE overlapping the portion of the gate G2 may correspond to the capacitor. However, this is merely an example, and the upper electrode UE according to an embodiment of the inventive concept may be omitted.

A third insulating layer 30 may be disposed on the second insulating layer 20 and may cover the upper electrode UE. In this embodiment, the third insulating layer 30 may include a single-layered silicon oxide layer. The first connection electrode CNE1 may be disposed on the third insulating layer 30 and may be connected to the signal line SCL, through a contact hole CNT-1 passing through the first to third insulating layers 10, 20, and 30.

A fourth insulating layer 40 may be disposed on the third insulating layer 30 and may cover the first connection electrode CNE1. The fourth insulating layer 40 may be, for example, a single-layered silicon oxide layer.

A fifth insulating layer 50 may be disposed on the fourth insulating layer 40 and, for example, may be an organic layer. A second connection electrode CNE2 may be on the fifth insulating layer 50 and may be connected to the first connection electrode CNE1 through a contact hole CNT-2 passing through the fourth insulating layer 40 and fifth insulating layer 50.

A sixth insulating layer 60 may be disposed on the fifth insulating layer 50 and may cover the second connection electrode CNE2. The sixth insulating layer 60 may be, for example, an organic layer.

The image realization layer DP-OLED may include a first electrode AE, a pixel defining layer PDL, and a light emitting element OLED. The first electrode AE may be on the sixth insulating layer 60 and may be connected to the second connection electrode CNE2 through a contact hole CNT-3 passing through the sixth insulating layer 60. An opening OP may be in the pixel defining layer PDL to expose at least a portion of the first electrode AE.

The active area DP-AA (e.g., see FIG. 3) may include an emission area PXA and a light blocking area NPXA adjacent to the emission area PXA. The light blocking area NPXA may surround the emission area PXA. In this embodiment, the emission area PXA may correspond to a portion of an area of the first electrode AE exposed by the opening OP.

A hole control layer HCL may be commonly disposed on the emission area PXA and the light blocking area NPXA. The hole control layer HCL may include a hole transport layer and may further include a hole injection layer. An emission layer EML may be disposed on the hole control layer HCL and an area corresponding to the opening OP. The light emitting layer EML may be formed to be separated from each of the pixels PX.

An electronic control layer ECL may be disposed on the emission layer EML and may include an electron transport layer, and may further include an electron injection layer. The hole control layer HCL and the electron control layer ECL may be commonly formed in pixels, for example, using an open mask. The second electrode CE may be on the electronic control layer ECL and may have an integrated shape. The second electrode CE may be commonly disposed in the plurality of pixels PX.

The thin film encapsulation layer TFL may be disposed on the image realization layer DP-OLED to cover the image realization layer DP-OLED. The thin film encapsulation layer TFL may include a first inorganic layer, an organic layer, and a second inorganic layer which are sequentially laminated in the third direction DR3. However, this is merely an example and may have a different structure in other embodiments. According to an embodiment of the inventive concept, the thin film encapsulation layer TFL may further include a plurality of inorganic layers and a plurality of organic layers.

The first inorganic layer may prevent external moisture or oxygen from penetrating into the image realization layer DP-OLED. For example, the first inorganic layer may include silicon nitride, silicon oxide, or a combination thereof.

The organic layer may be disposed on the first inorganic layer to provide a flat surface. A curve provided on a top surface of the first inorganic layer or particles on the first inorganic layer may be covered by the organic layer. For example, the organic layer may include an acrylic-based organic layer, but the embodiment of the inventive concept is not limited thereto.

The second inorganic layer may be disposed on the organic layer to cover the organic layer and may be prevented from external exposure or encapsulating moisture or the like, which is discharged from the organic layer. The second inorganic layer may include silicon nitride, silicon oxide, or a combination thereof.

Figure 5A:
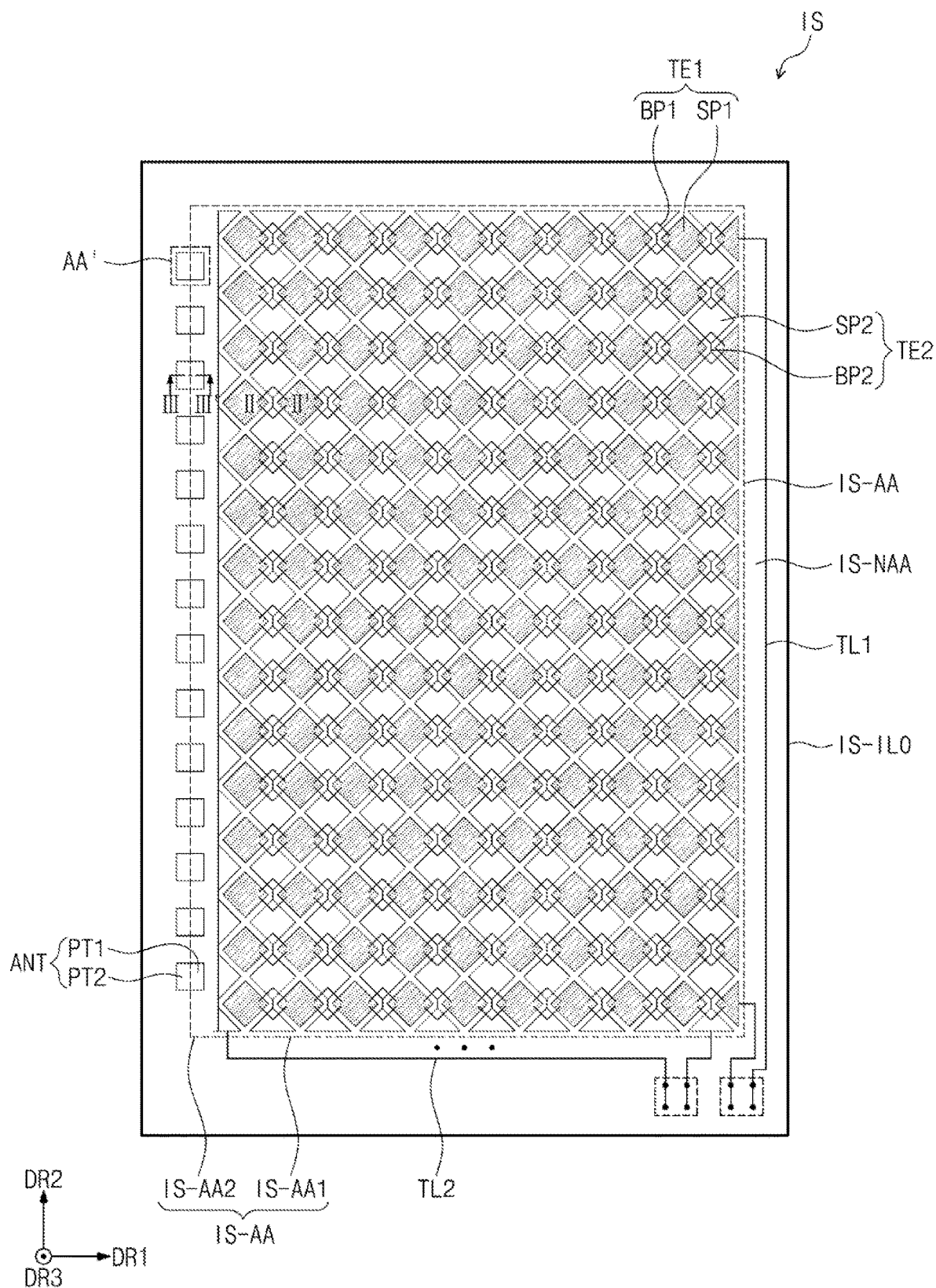
FIG. 5A illustrates an embodiment of a sensor layer.
Figure 5B:
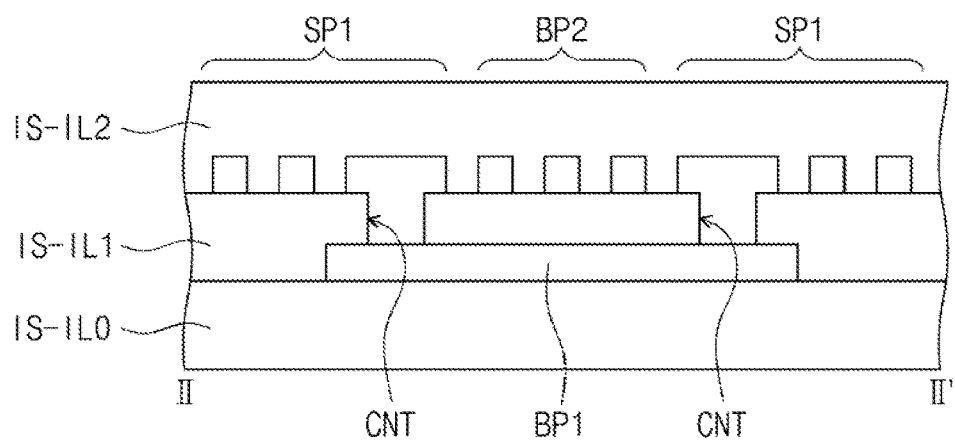
FIG. 5B is a cross-sectional view taken along line II-IP of FIG. 5A according to an embodiment of the inventive concept.
Figure 5B:
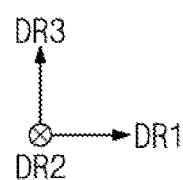
Figure 5C:
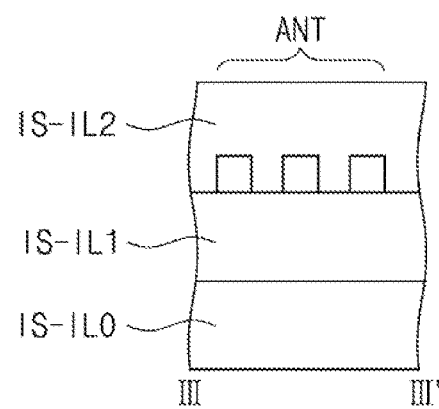
FIG. 5C is a cross-sectional view taken along line of FIG. 5A according to an embodiment of the inventive concept.
Figure 5C:
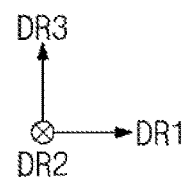

FIG. 5A is a plan view of a sensor layer IS according to an embodiment of the inventive concept, FIG. 5B is a cross-sectional view taken along line II-II' of FIG. 5A according to an embodiment of the inventive concept, and FIG. 5C is a cross-sectional view taken along line III-III' of FIG. 5A according to an embodiment of the inventive concept.

Referring to FIGS. 5A to 5C, an active area IS-AA and a peripheral area SI-NAA surrounding the active area IS-AA may be disposed on the sensor layer IS. The active area IS-AA may be activated according to an electrical signal. When viewed in a plan view, the active area IS-AA may overlap the active area DP-AA of the display layer DP, and the peripheral area IS-NAA may overlap the peripheral area DP-NAA of the display layer DP (e.g., see FIG. 4A).

The active area IS-AA may include a first active area IS-AA1 and a second active area IS-AA2. A plurality of sensing electrodes TE1 and TE2 may be disposed on the first active area IS-AA1. A first portion PT1 of each of the antenna patterns ANT may be on the second active area IS-AA2. A dummy pattern may be further disposed on the second active area IS-AA2. The dummy pattern may reduce a difference in reflectance between a portion at which the antenna pattern ANT is disposed and a portion at which the antenna pattern ANT is not disposed. Thus, the antenna pattern ANT may be prevented from being visually recognized externally. When viewed in a plan view, the first active area IS-AA1 may overlap the sensing area SP (e.g., see FIG. 1B). When viewed in a plan view, the second active area IS-AA2 and the peripheral area IS-NAA may overlap the antenna area AP (e.g., see FIG. 1B). The antenna pattern ANT may be floated.

The sensor layer IS may include a base insulating layer IS-IL0, a plurality of sensing electrodes TE1 and TE2, a plurality of sensing lines TL1 and TL2, and a plurality of antenna patterns ANT. The base insulating layer IS-IL0 may be an inorganic layer including one of silicon nitride, silicon oxynitride, and silicon oxide. In one embodiment, the base insulating layer IS-IL0 may be an organic layer including an epoxy resin, an acrylic resin, or an imide-based resin. The base insulating layer IS-IL0 may be directly disposed on the display layer DP (e.g., see FIG. 1B). In one embodiment, the base insulating layer IS-IL0 may be coupled to the display layer DP through an adhesive.

The sensing electrodes TE1 and TE2 may be disposed on the sensing area SP and, for example, may include a plurality of first sensing electrodes TE1 and a plurality of second sensing electrodes TE2. The sensor layer IS may acquire information on an external input through a change in capacitance between the plurality of first sensing electrodes TE1 and the plurality of second sensing electrodes TE2.

Each of the first sensing electrodes 1 may extend in the first direction DR1. The plurality of first sensing electrodes TE1 may be arranged in the second direction DR2. Each of the first sensing electrodes TE1 may include a plurality of sensing patterns SP1 and a plurality of bridge patterns BP1. The first sensing electrodes TE1 may extend in the second direction DR2, and the second sensing electrodes TE2 may be arranged in the first direction DR1. Each of the second sensing electrodes TE2 may include a plurality of first portions SP2 and a plurality of second portions BP2.

FIG. 5A illustrates that two bridge patterns BP1 are connected to two adjacent sensing patterns SP1, but the plurality of bridge patterns BP1 and the plurality of sensing patterns SP1 according to an embodiment of the inventive concept are not limited thereto. For example, two sensing patterns SP1 adjacent to each other may be connected by one bridge pattern BP1.

The second portions BP2 may be disposed on a layer different from that on which the bridge patterns BP1 are disposed. The bridge patterns BP1 may insulatively cross the second sensing electrodes TE2. For example, the second portions BP2 may insulatively cross the plurality of bridge patterns BP1, respectively. The bridge patterns BP1 may be disposed on the base insulating layer IS-IL0. The first insulating layer IS-IL1 may be disposed on the plurality of bridge patterns BP1. The first insulating layer IS-IL1 may has a single-layered or multilayered structure. The first insulating layer IS-IL1 may include an inorganic material, an organic material, or a composite material.

The sensing patterns SP1, the first portions SP2, and the second portions BP2 may be disposed on the first insulating layer IS-IL1. The sensing patterns SP1, the first portions SP2, and the second portions BP2 may have a mesh structure.

The contact holes CNT may be defined by passing through the first insulating layer IS-IL1 in the third direction DR3. The two adjacent sensing patterns SP1 of the sensing patterns SP1 may be electrically connected to the bridge pattern BP1 through the plurality of contact holes CNT.

The second insulating layer IS-IL2 may be disposed on the sensing patterns SP1, the first portions SP2, and the second portions BP2. The third insulating layer IS-IL2 may have a single-layered or multilayered structure. The second insulating layer IS-IL2 may include an inorganic material, an organic material, or a composite material.

In FIG. 5B, an example of a bottom bridge structure is shown in which the bridge patterns BP1 are disposed below the sensing patterns SP1, the first portions SP2, and the second portions BP2. For example, the sensor layer IS may have a top bridge structure in which the plurality of bridge patterns BP1 are disposed on the sensing patterns SP1, the first portions SP2, and the second portions BP2.

The antenna patterns ANT may be disposed on the same layer as one or more of the sensing electrodes TE1 and TE2. In one embodiment, the antenna patterns ANT may be on the first insulating layer IS-IL1. For example, the antenna patterns ANT may be on the same layer as the sensing patterns SP1, the first portions SP2, and the second portions BP2. However, this is merely an example, and the connection relationship between the plurality of connection patterns ANT according to an embodiment of the inventive concept is not limited thereto. For example, the antenna patterns ANT may be disposed on the same layer as the bridge patterns BP1. In one embodiment, the antenna patterns ANT may have a mesh structure.

According to an embodiment of the inventive concept, the antenna patterns ANT may be disposed on the same layer as some of the plurality of sensing electrodes TE1 and TE2, which sense an external input, rather than a separate layer. Thus, a thickness of the electronic device DD may be reduced, and a weight of the electronic device DD (e.g., see FIG. 1A) may be reduced.

The antenna patterns ANT includes substantially the same material as some of the sensing electrodes TE1 and TE2 and, for example, may be formed through substantially the same process. For example, each of the first sensing electrodes TE1 and the antenna patterns ANT may include a carbon nanotube, a metal and/or a metal alloy or a composite material thereof, and may have a single-layered structure or a multilayered structure, e.g., in which titanium (Ti), aluminum (Al), and titanium (Ti) are sequentially laminated. However, this is merely an example. For example, according to an embodiment of the inventive concept, the antenna patterns ANT may include a material different from the first sensing electrodes TE1 and may be formed through a separate process. For example, the first sensing electrodes TE1 may have a multilayer structure in which titanium (Ti), aluminum (Al), and titanium (Ti) are sequentially stacked, and a plurality of antenna patterns ANT may include carbon nanotubes, metals and/or metal alloys, or composite materials thereof. The antenna patterns ANT may have a single-layered or multilayered structure, and the metal material may be silver (Ag), copper (Cu), aluminum (Al), gold (Au), or platinum (Pt), but is not limited thereto.

The antenna patterns ANT may include a first portion PT1 and a second portion PT2, and the first portion PT1 may be adjacent to the sensing area SP (e.g., see FIG. 1B). The second portion PT2 may extend from the first portion PT1 in the first direction DR1. The first portion PT1 and the second portion PT2 may be integrated with each other. The second portion PT2 may be a portion of the antenna pattern ANT except for the first portion PT1.

The first portion PT1 may be disposed on the active area IS-AA. When viewed in a plan view, the first portion PT1 may overlap the active area DP-AA of the display layer DP (e.g., see FIG. 4A).

The second portion PT2 may be disposed on the peripheral area IS-NAA. When viewed in a plan view, the second portion PT2 may overlap the peripheral area (DP-NAA) of the display layer DP (e.g., see FIG. 4A).

The antenna patterns ANT may further include at least one ground electrode below the base insulating layer IS-IL0. However, this is merely an example. For example, according to an embodiment of the inventive concept, the ground electrode may be the second electrode CE of the display layer DP (e.g., see FIG. 4B).

The sensing lines TL1 and TL2 may include a plurality of first sensing lines TL1 and a plurality of second sensing lines TL2. The first sensing lines TL1 may be electrically connected to the first sensing electrodes TE1, respectively. The second sensing lines TL2 may be electrically connected to the plurality of second sensing electrodes TE2, respectively.

The first sensing pads TD1 may be electrically connected to the first sensing lines TL1 through contact holes, respectively. The second sensing pads TD2 may be electrically connected to the plurality of second sensing lines TL2 through contact holes, respectively (e.g., see FIG. 4A).

Figure 6:
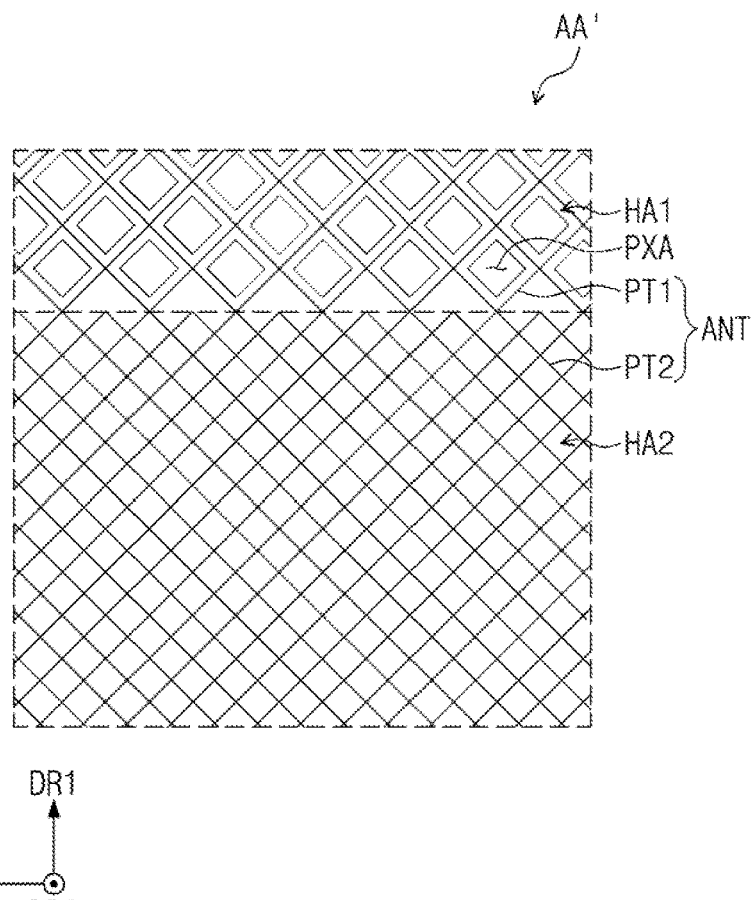
FIG. 6 illustrates area AA' in FIG. 5A according to an embodiment of the inventive concept.

FIG. 6 is a plan view of an area AA' of FIG. 5A according to an embodiment of the inventive concept. Referring to FIG. 6, the antenna pattern ANT may have a quadrangular shape defined by the first direction DR1 and the second direction DR2, but may have a different shape in another embodiment. The antenna pattern ANT may have a mesh structure. A first opening HA1 may be in the first portion PT1, and a second opening HA2 may be in the second portion PT2. The size of the first opening HA1 may be greater than that of the second opening HA2. The first opening HA1 may overlap the emission area PXA (e.g., see FIG. 4B), and the size of the first opening HA1 may be larger than that of the emission area PXA (e.g., refer to FIG. 4B).

Figure 7:
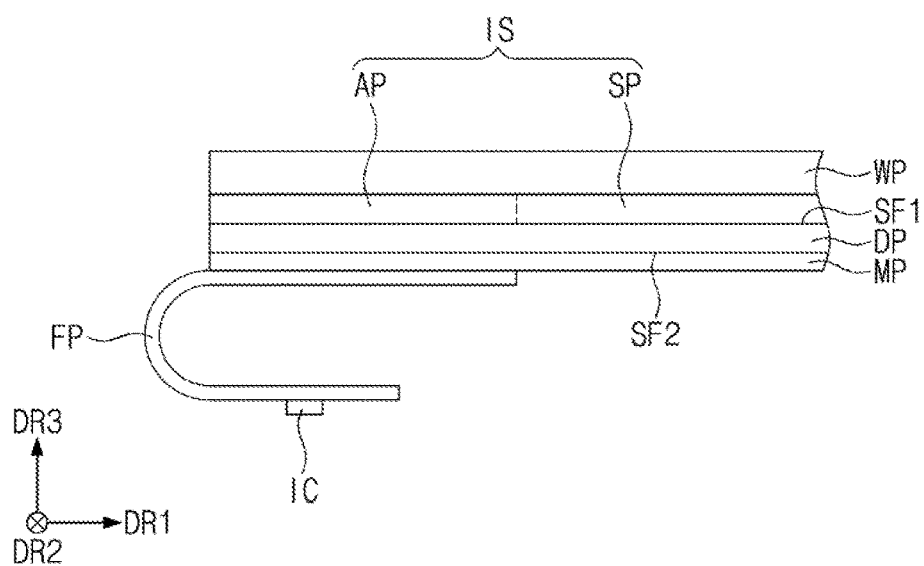
FIG. 7 illustrates an electronic device according to an embodiment of the inventive concept.
Figure 8:
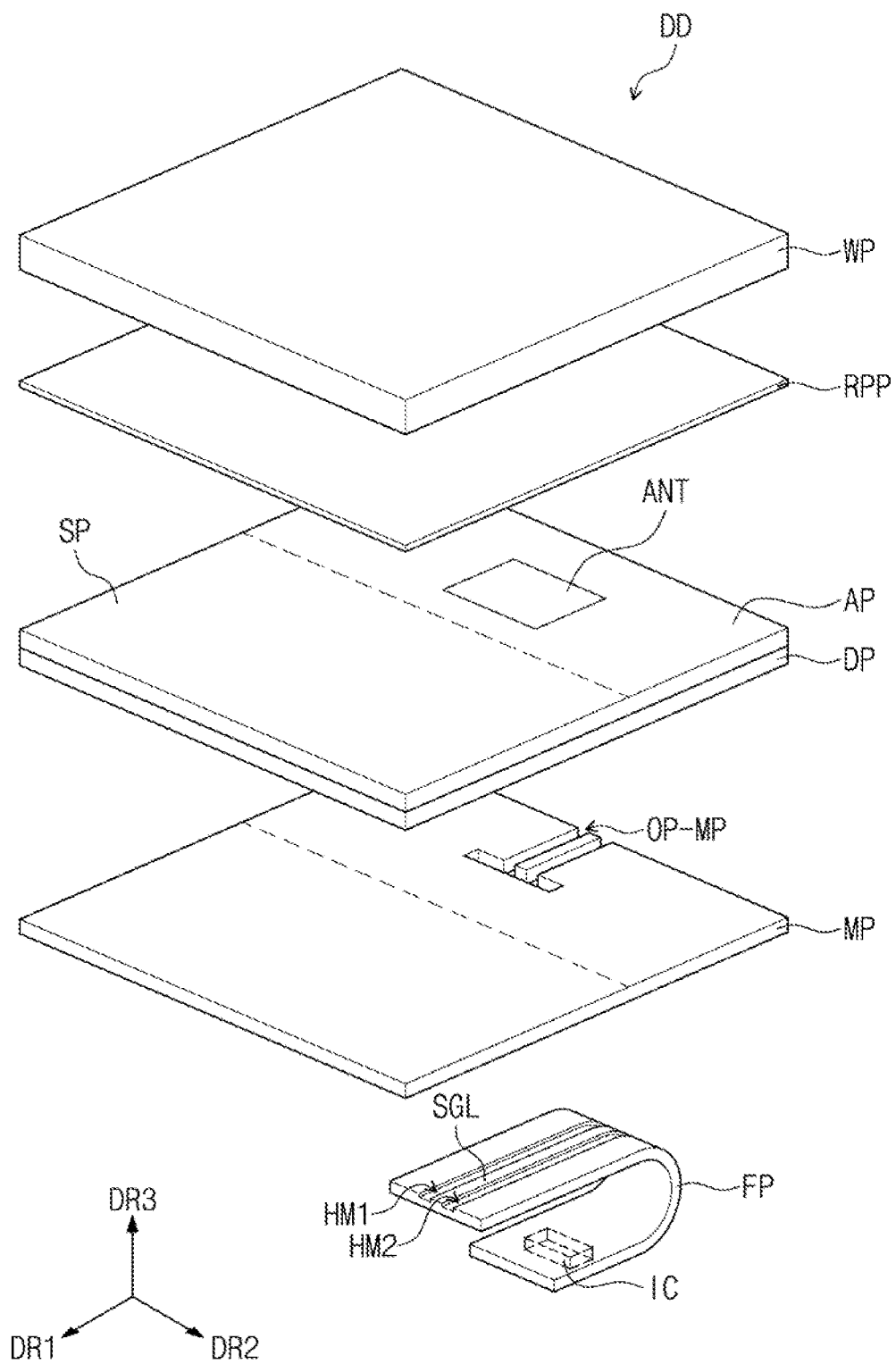
FIG. 8 illustrates an electronic device according to an embodiment of the inventive concept.

FIG. 7 is a cross-sectional view of an electronic device according to an embodiment of the inventive concept, and FIG. 8 is an exploded perspective view of the electronic device according to an embodiment of the inventive concept.

Referring to FIGS. 7 and 8, the display layer DP may include a first surface SF1 and a second surface SF2 that face each other. The first surface SF1 may be referred to as a top surface of the display layer DP, and the second surface FS2 may be referred to as a bottom surface of the display layer DP. The sensor layer IS may face the first surface SF1.

The cover layer MP may face the second surface SF2. The cover layer MP may be spaced apart from the sensor layer IS in the third direction DR3 with the display layer DP therebetween. An opening OP-MP may be defined in the cover layer MP. When viewed in a plan view, the opening OP-MP may overlap the antenna pattern ANT. In one embodiment, the opening OP-MP may overlap the active area DP-AA (e.g., see FIG. 4A).

The driving chip IC may be disposed below the cover layer MP and may provide signals to control operation of the antenna pattern ANT. For example, the driving chip IC may control beam steering of the antenna patterns ANT by adjusting power supplied to the antenna patterns ANT in the antenna area AP and may improve energy by focusing one or more frequency signals in a specific direction. Also, a desired radiation pattern may be formed to improve radiation efficiency. In an embodiment of the inventive concept, the driving chip IC may be referred to as a beamforming chip IC.

The transmission part FP may be coupled to the bottom surface of the cover layer MP. When viewed in a plan view, the transmission part FP may overlap the opening OP-MP. The transmission part FP may include a first surface and a second surface facing the first surface. The driving chip IC may be on the first surface. The transmission part FP may be bent, and the second surfaces of the transmission part FP may face each other.

The transmission part FP may have a ground coplanar wave guide (GCPW) structure. A first groove HM1 and a second groove HM2 spaced apart from the first groove HM1 in the second direction DR2 may be in the first surface of the transmission part FP. When viewed in a plan view, the first groove HM1 and second groove HM2 may overlap the opening OP-MP.

The transmission part FP and the cover layer MP may be bonded to each other through an adhesive. An adhesive may be disposed between the transmission part FP and the cover layer MP. The adhesive may include, for example, an anisotropic conductive film (ACF). However, this is merely an example, and according to an embodiment of the inventive concept the adhesive may include various materials for bonding the transmission part FP to the cover layer MP. For example, the adhesive may include a pressure sensitive adhesive film (PSA), an optically clear adhesive film (OCA), or an optically clear adhesive resin (OCR). When viewed in a plan view, the adhesive may non-overlap the opening OP-MP.

The driving chip IC may transmit a signal through a transmission line SGL between the first groove HM1 and the second groove HM2. When viewed in a plan view, the transmission line SGL may non-overlap the opening OP-MP. The signal may provide a signal to the antenna pattern ANT through the opening OP-MP defined in the cover layer MP. For example, the signal may be radiated to the antenna pattern ANT through the opening OP-MP. In one embodiment, the signal may be indirectly supplied to the antenna pattern ANT through the opening OP-MP. The indirect supplying may involve, for example, transmitting the signal without a configuration directly connected to the antenna pattern ANT.

According to an embodiment of the inventive concept, the electronic device DD may supply power to the antenna pattern ANT using the opening OP-MP in the cover layer MP, which may be configured to block electromagnetic waves. The electronic device DD may not include a separate component for supplying power to the antenna pattern ANT. Accordingly, the thickness of the electronic device DD may be reduced.

If a transmission part on which a driving chip is mounted is electrically connected on a sensor layer, one option may involve bending it toward the rear surface of the display layer. In this case, the driving chip may directly supply power to an antenna pattern. However, performance of an anti-reflection layer may be deteriorated by the transmission part disposed being on the sensor layer. As a result, overall performance of a host electronic device for displaying images may be deteriorated. Also, external input sensing performance of the electronic device may be deteriorated if the transmission part is disposed on the sensor layer.

However, according to one or more embodiments of the inventive concept, the transmission part FP may be bonded to the bottom surface of the cover layer MP disposed below the display layer DP. The driving chip IC may indirectly supply power to the antenna pattern ANT through the cover layer MP. A configuration connected to the driving chip IC may not be disposed between the display layer DP and the anti-reflection layer RPP to supply power to the antenna pattern ANT. Accordingly, performance of the electronic device DD for displaying the image (e.g., see FIG. 1A) may be improved. In addition, a configuration connected to the driving chip IC may not be disposed between the sensor layer IS and the anti-reflection layer RPP to supply power to the antenna pattern ANT. Thus, external input sensing performance of the electronic device DD may be improved.

Also, according to an embodiment of the inventive concept, the transmission part FP may be bonded to the bottom surface of the cover layer MP disposed below the display layer DP. The transmission part FP may not be disposed between the display layer DP and the anti-reflection layer RPP or between the sensor layer IS and the anti-reflection layer RPP. Thus, the transmission part FP may not be exposed to the outside, and a phenomenon in which durability of the transmission part FP is reduced due to an external impact may be prevented.

Figure 9:
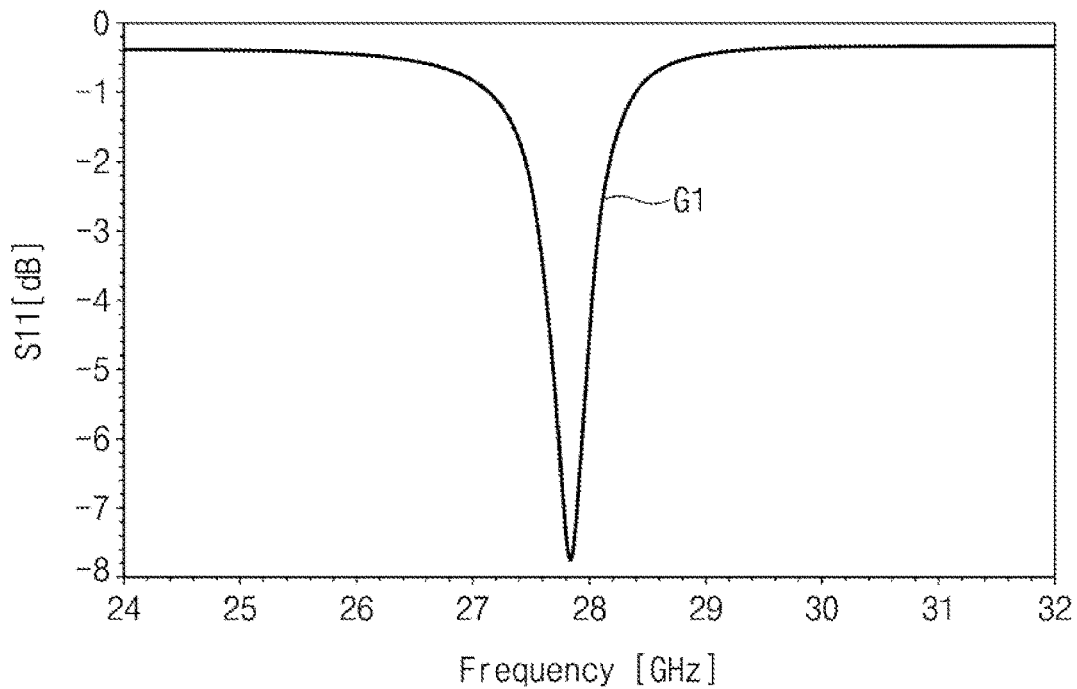
FIG. 9 illustrates an S-parameter depending on a frequency of an antenna pattern according to an embodiment of the inventive concept.

FIG. 9 is a graph illustrating a curve G1 corresponding to values of an S-parameter plotted relative to frequency of an antenna pattern according to a non-limiting example embodiment of the inventive concept. Referring to FIGS. 8 and 9, each value S11 on curve G1 may represent the magnitude of a reflection of an input signal and, for example, may be expressed based on a ratio of the magnitude of the reflected input signal to the magnitude of the input signal. In one embodiment, each value of S11 on the curve G1 may be a reflection coefficient of the antenna pattern ANT.

When determining operation of the antenna pattern ANT, the value S11 may have a negative value. When the value S11 has a negative value, the magnitude of the reflected input signal may be less than the magnitude of the input signal. Smaller values of S11 may correspond to smaller magnitudes of the reflected input signal. The negative peak of curve G1 may be used as a basis for determining the frequency (or frequency band) at which the antenna pattern ANT is operating. In the example of curve G1, the downward peak of the antenna pattern ANT operates at a frequency of about 27.8 GHz.

Figure 10:
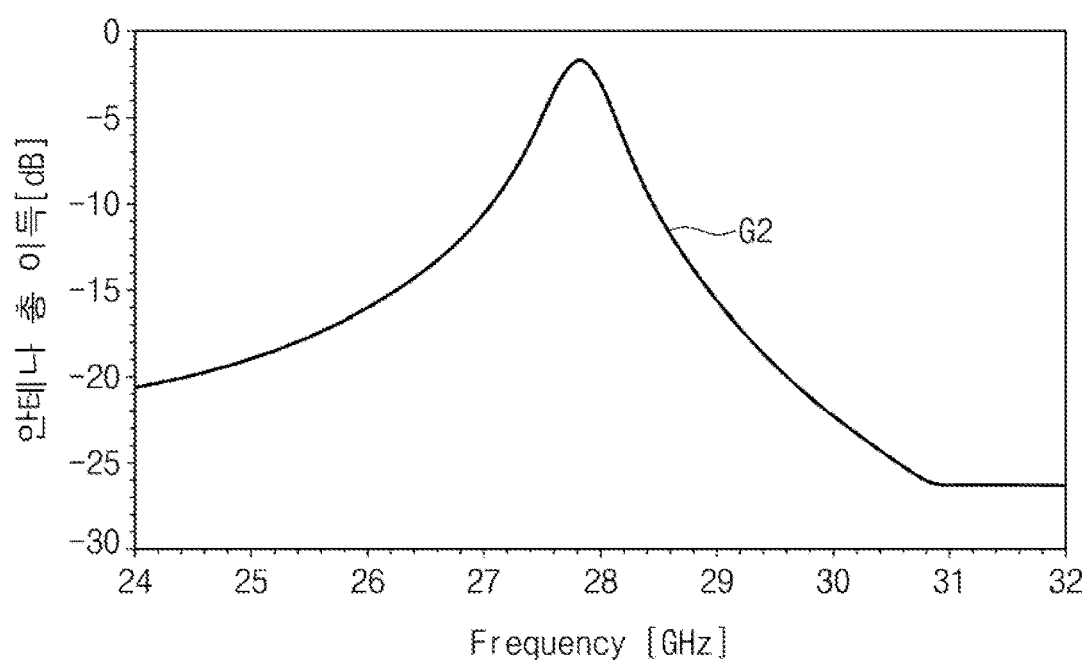
FIG. 10 illustrates a total gain depending on a frequency of the antenna pattern according to an embodiment of the inventive concept.

FIG. 10 is a graph illustrating a total gain depending on a frequency of the antenna pattern according to an example embodiment of the inventive concept. Referring to FIGS. 8 and 10, the antenna pattern ANT may be electrically connected to the driving chip IC through the cover layer MP. The antenna pattern ANT may indirectly receive power from the driving chip IC to operate at a specific frequency. For example, referring to the second graph G2, the antenna pattern ANT may maintain a total antenna gain of about −1 dB at the specific frequency. In this case, the specific frequency may be about 27.8 GHz. Thus, when the frequency signal is transmitted, received, or transmitted/recessed, the antenna pattern ANT having reduced loss may be provided.

Figure 11:
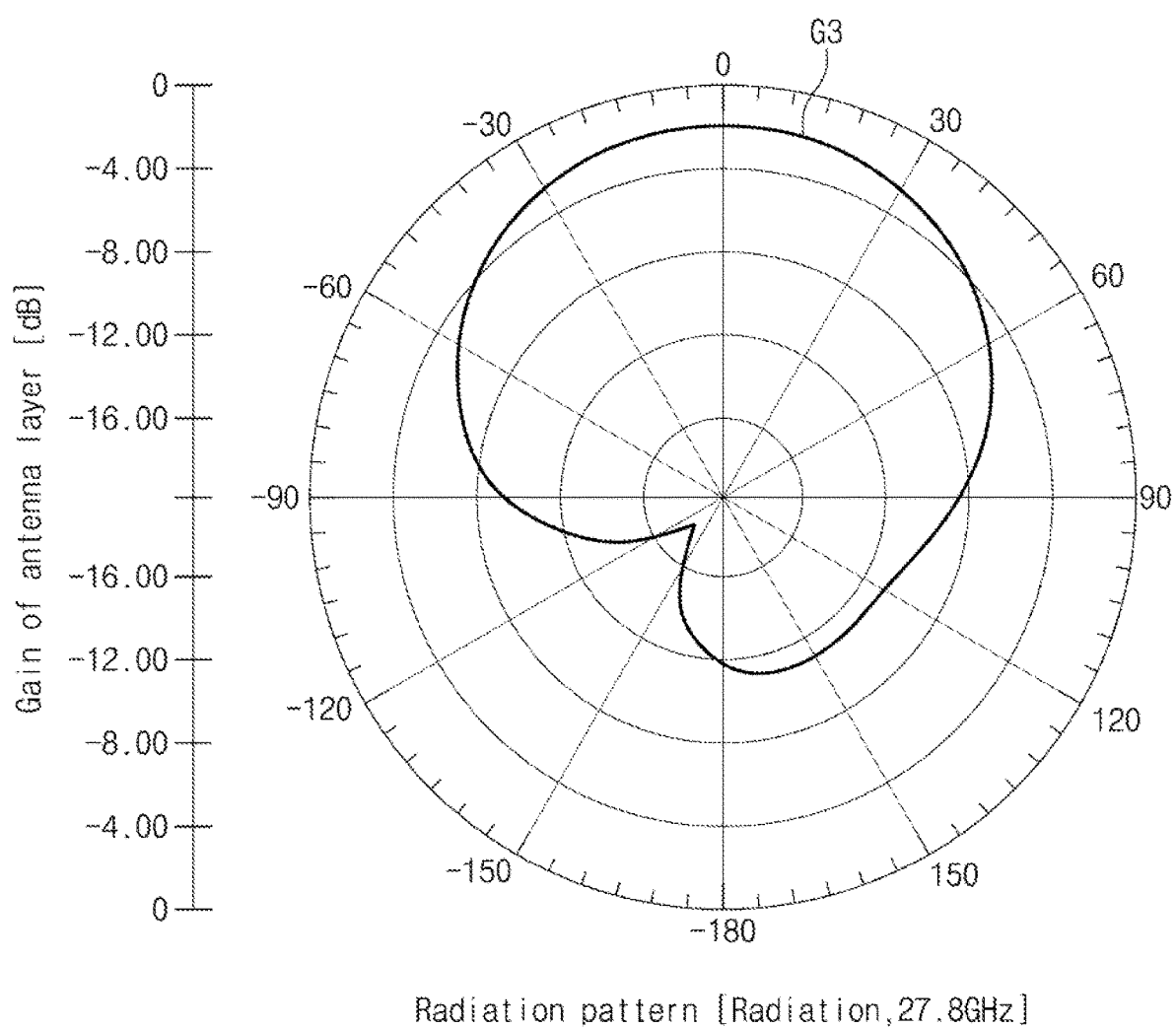
FIG. 11 illustrates a radiation pattern of the antenna pattern according to an embodiment of the inventive concept.

FIG. 11 is a graph illustrating a radiation pattern of the antenna pattern according to an example embodiment of the inventive concept. Referring to FIGS. 8 and 11, a third graph G3 shows a radiation pattern of a frequency signal radiated by the antenna pattern ANT. If the antenna gain is close to about 0 dB in the radiation pattern, it may be said that the frequency signal is radiated in the corresponding direction. In this direction, 0 may refer to the third direction DR3. Thus, the antenna pattern ANT may indirectly receive power from the driving chip IC to radiate a frequency signal at about 27.8 GHz in the third direction DR3. Therefore, it may be said that the frequency signal has directivity in the third direction DR3.

FIGS. 12A to 12E are plan views of various embodiments of the antenna pattern according to an embodiment of the inventive concept. In the description of FIGS. 12A to 12E, the same reference numerals are used for the components described with reference to FIG. 6, and descriptions thereof are omitted.

Figure 12A:
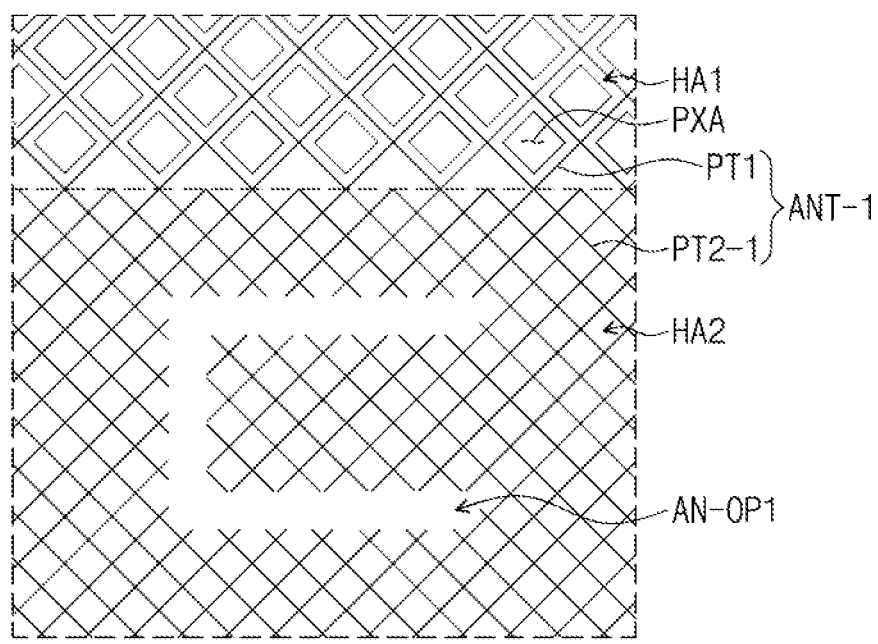
FIGS. 12A to 12E illustrate antenna patterns according to an embodiment of the inventive concept.
Figure 12A:
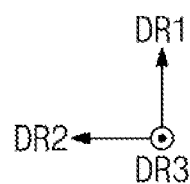

Referring to FIG. 12A, an antenna pattern ANT-1 may have a quadrangular shape defined by the first direction DR1 and the second direction DR2. The antenna pattern ANT-1 may include a first portion PT1 and a second portion PT2-1. The first portion PT1 may overlap the active area IS-AA, and the second portion PT2-1 may overlap the peripheral area IS-NAA (e.g., see FIG. 5A). A first opening AN-OP1 may be defined in the second portion PT2-1. The first opening AN-OP1 may include a first portion extending in the second direction DR2, a second portion extending from one end of the first portion in the first direction DR1, and a third portion extending from one end of the second portion in the second direction DR2. When viewed in a plan view, at least a portion of the first opening AN-OP1 may overlap the opening OP-MP of the cover layer MP (e.g., see FIG. 8). According to the inventive concept, the first opening AN-OP1 may deform a radiation pattern of the antenna pattern ANT-1. Thus, when the frequency signal is transmitted, received, or transmitted/recessed, antenna pattern ANT may have improved radiation performance.

Figure 12B:
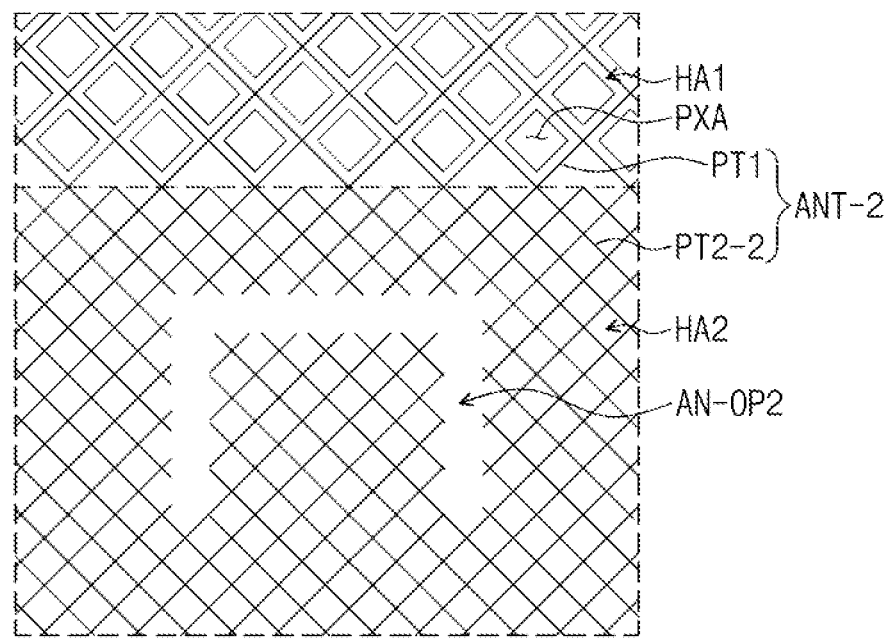
Figure 12B:
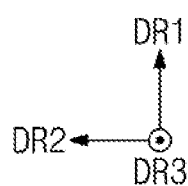

Referring to FIG. 12B, an antenna pattern ANT-2 may have a quadrangular shape defined by the first direction DR1 and the second direction DR2. The antenna pattern ANT-2 may include a first portion PT1 and a second portion PT2-2. The first portion PT1 may overlap the active area IS-AA, and the second portion PT2-2 may overlap the peripheral area IS-NAA (e.g., see FIG. 5A). A second opening AN-OP2 may be defined in the second portion PT2-2. The second opening AN-OP2 may include a first portion extending in the first direction DR1, a second portion extending from one end of the first portion in the second direction DR2, and a third portion extending from one end of the second portion in the first direction DR1. When viewed in a plan view, at least a portion of the second opening AN-OP2 may overlap the opening OP-MP of the cover layer MP (e.g., see FIG. 8). According to an embodiment of the inventive concept, the second opening AN-OP2 may deform a radiation pattern of the antenna pattern ANT-2. Thus, when the frequency signal is transmitted, received, or transmitted/recessed, antenna pattern ANT-2 may have improved radiation performance.

Figure 12C:
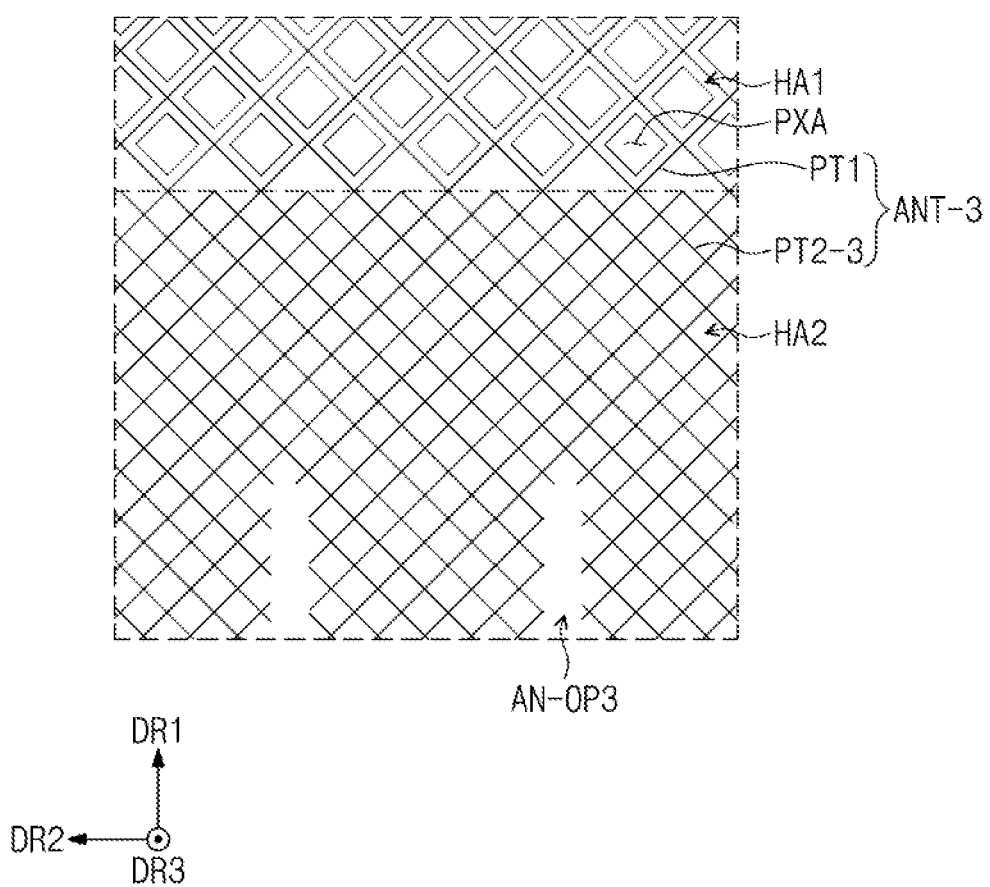

Referring to FIG. 12C, an antenna pattern ANT-3 may have a quadrangular shape defined by the first direction DR1 and the second direction DR2. The antenna pattern ANT-3 may include a first portion PT1 and a second portion PT2-3. The first portion PT1 may overlap the active area IS-AA, and the second portion PT2-3 may overlap the peripheral area IS-NAA (e.g., see FIG. 5A). A third opening AN-OP3 may be defined in the second portion PT2-3. In one embodiment, a plurality of third openings AN-OP3 may be provided. The third opening AN-OP3 may extend from one side of the antenna pattern ANT-3 in the first direction DR1. According to an embodiment of the inventive concept, the third opening AN-OP3 may deform a radiation pattern of the antenna pattern ANT-3. Thus, when the frequency signal is transmitted, received, or transmitted/recessed, antenna pattern ANT-3 may have improved radiation performance.

Figure 12D:
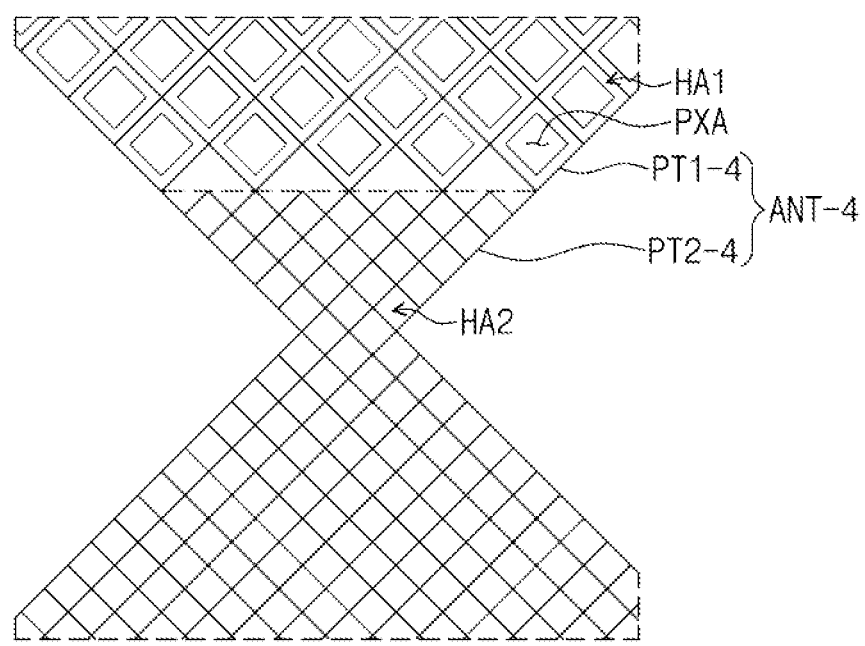
Figure 12D:
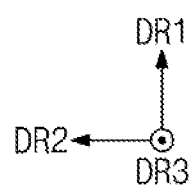

Referring to FIG. 12D, the antenna pattern ANT-4 may have a Bow-tie shape. However, the shape of the antenna pattern ANT-4 is not particularly limited and may have other shapes. For example, the shape of the antenna pattern ANT-4 may have triangular or circular shape. According to an embodiment of the inventive concept, the shape of the antenna pattern ANT-4 may deform a radiation pattern of the antenna pattern ANT-4. Thus, when the frequency signal is transmitted, received, or transmitted/recessed, antenna pattern ANT-4 may have improved radiation performance.

The antenna pattern ANT-4 may include a first portion PT1-4 and a second portion PT2-4. The first portion PT1-4 may overlap the active area IS-AA, and the second portion PT2-4 may overlap the peripheral area IS-NAA (e.g., see FIG. 5A). A first opening HA1 may be in the first portion PT1-4, and a second opening HA2 may be in the second portion PT2-4.

Figure 12E:
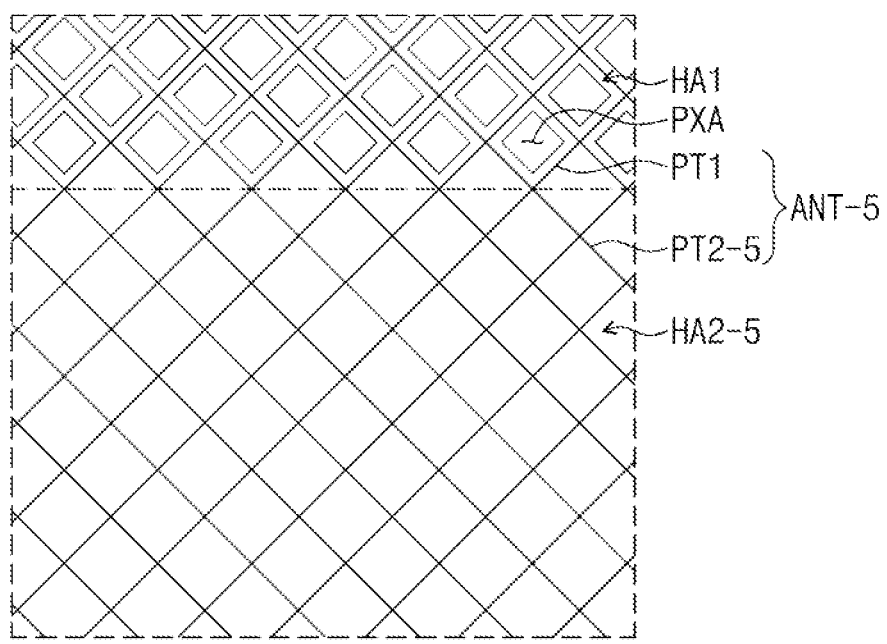
Figure 12E:
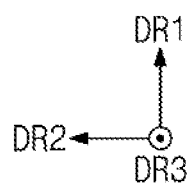

Referring to FIG. 12E, the antenna pattern ANT-5 may have a quadrangular shape defined by the first direction DR1 and the second direction DR2. The antenna pattern ANT-5 may include a first portion PT1 and a second portion PT2-5. The first portion PT1 may overlap the active area IS-AA, and the second portion PT2-5 may overlap the peripheral area IS-NAA (e.g., see FIG. 5A). A second opening HA2-5 may be in the second portion PT2-5. The size of the first opening HA1 may be substantially the same as that of the second opening HA2-5. According to an embodiment of the inventive concept, the radiation pattern of the antenna pattern ANT-5 may be deformed by a size of each of the openings HA1 and HA2-5 in the antenna pattern ANT-5. Thus, when the frequency signal is transmitted, received, or transmitted/recessed, antenna pattern ANT-5 may have improved radiation performance.

Figure 13:
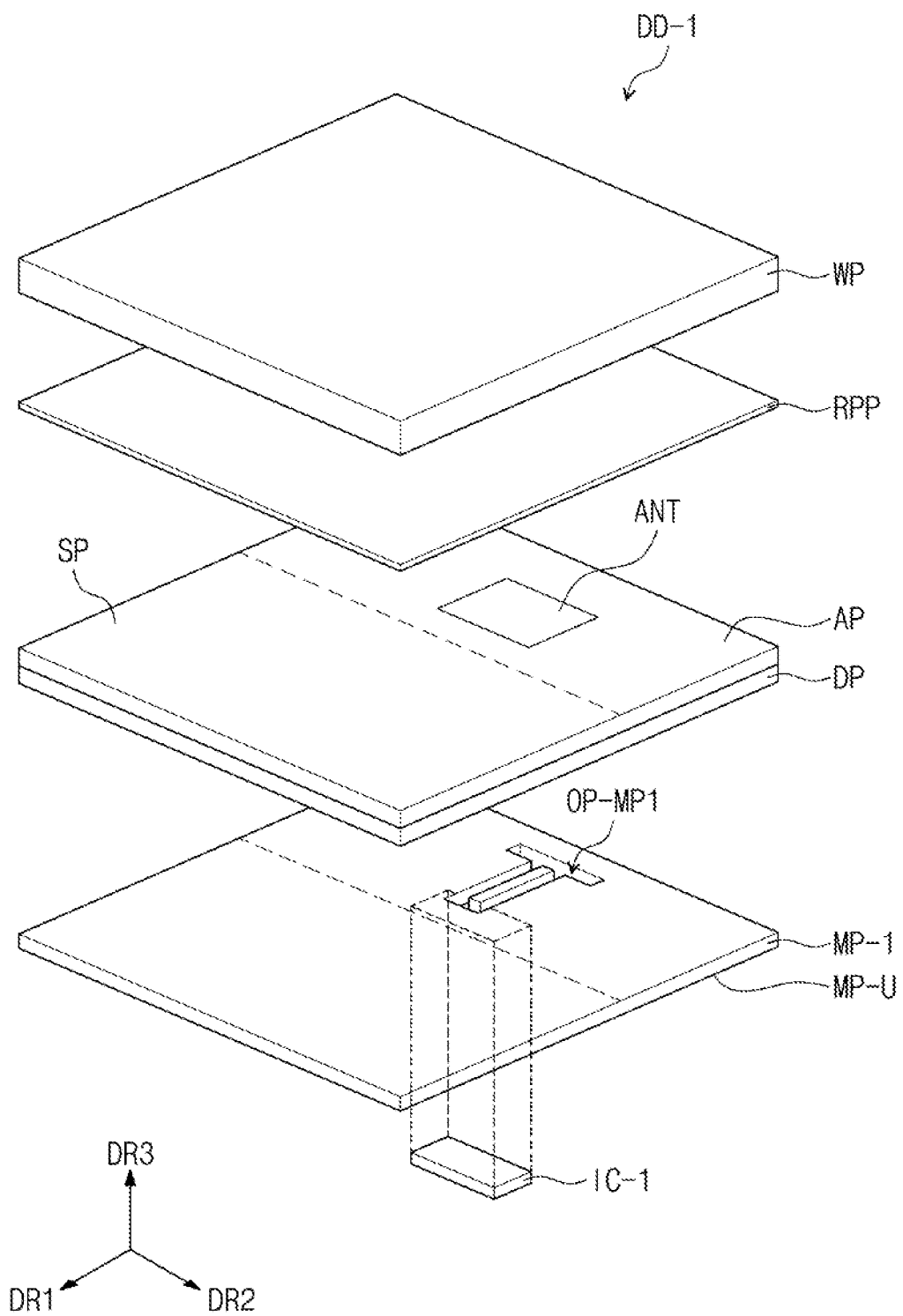
FIG. 13 illustrates an electronic device according to an embodiment of the inventive concept.

FIG. 13 is an exploded perspective view of an electronic device DD-1 according to an embodiment of the inventive concept. In FIG. 13, like reference numerals are used for like components in FIG. 8.

Referring to FIG. 13, a cover layer MP-1 may be spaced apart from a sensor layer IS in the third direction DR3, with a display layer DP therebetween. An opening OP-MP1 may be in the cover layer MP-1. When viewed in a plan view, opening OP-MP1 may overlap antenna pattern ANT. The opening OP-MP1 may overlap the active area DP-AA (e.g., see FIG. 4A).

A driving chip IC-1 may be on a bottom surface MP-U of the cover layer MP-1 and may be adjacent to the opening OP-MP1. The surface of the driving chip IC-1 facing the bottom surface MP-U may have a ground coplanar wave guide (GCPW) structure. The driving chip IC-1 and the cover layer MP-1 may be bonded to each other through an adhesive. The adhesive may include an anisotropic conductive film (ACF). However, this is merely an example. According to an embodiment of the inventive concept, the adhesive may include various materials for bonding the transmission part FP to the cover layer MP. For example, the adhesive may include a pressure sensitive adhesive film (PSA), an optically clear adhesive film (OCA), or an optically clear adhesive resin (OCR). When viewed in a plan view, in one embodiment the adhesive may be offset from (e.g., not overlap) the opening OP-MP1.

The driving chip IC-1 may transmit a signal through the ground coplanar wave guide (GCPW) structure. The driving chip IC-1 may provide a signal to the antenna pattern ANT through the opening OP-MP1 defined in the cover layer MP-1. The signal may be radiated to the antenna pattern ANT through the opening OP-MP1. Thus, the signal may be indirectly supplied to the antenna pattern ANT through the opening OP-MP 1.

According to one or more embodiments of the inventive concept, the driving chip IC-1 providing signals to the antenna pattern ANT may be on the bottom surface MP-U of the cover layer MP-1. The driving chip IC-1 may be adjacent to the opening OP-MP1. The signals from the driving chip IC-1 may be adjacent to the opening OP-MP1 radiating the signals to the antenna pattern ANT. The signals that occur when transmitted from the driving chip IC-1 to the opening OP-MP1 may be prevented from being lost. Thus, the gain of a frequency signal that is transmitted, received, or transmitted/received by antenna pattern ANT may be improved.

Also, according to one or more embodiments of the inventive concept, the driving chip IC-1 may indirectly supply power to the antenna pattern ANT through the cover layer MP-1. A configuration connected to the driving chip IC may not be between a display layer DP and an anti-reflection layer RPP and between a sensor layer IS and the anti-reflection layer RPP to supply power to the antenna pattern ANT. Thus, performance of the electronic device DD-1 for displaying the image IM (e.g., see FIG. 1A) may be improved, and performance of the electronic device DD-1 for sensing an external input may be improved.

According to one or more of the aforementioned embodiments of the inventive concept, the electronic device may include the display layer, the sensor layer including the antenna pattern, the anti-reflection layer, the cover layer, the transmission part, and the driving chip. The transmission part on which the driving chip is mounted may be coupled to the bottom surface of the cover layer disposed below the display layer. The driving chip may indirectly supply the power to the antenna pattern through the cover layer. The external constituent connected to the driving chip to supply the power to the antenna pattern may not be disposed between the display layer and the anti-reflection layer or between the sensor layer and the anti-reflection layer. Therefore, image display performance of the electronic device may be improved, and also external input sensing performance of the electronic device may be improved.

It will be apparent to those skilled in the art that various modifications and deviations can be made in embodiments of the inventive concept. Thus, it is intended that the present disclosure covers the modifications and deviations of embodiments of this invention provided they come within the scope of the appended claims and their equivalents. Accordingly, the technical scope of embodiments of the inventive concept should not be limited to the contents described in the detailed description of the specification, but should be determined by the claims. The embodiments may be combined to form additional embodiments.

What is claimed is:

1. An electronic device, comprising:
a display layer including a peripheral area adjacent to an active area;
a sensor layer on the display layer and comprising a plurality of sensing electrodes and an antenna pattern;
a cover layer disposed below the display layer and including an opening overlapping the antenna pattern; and
a driving chip configured to provide a signal to the antenna pattern through the opening in the cover layer.

2. The electronic device of claim 1, wherein:
the antenna pattern comprises a second portion extending from a first portion, and
the first portion overlaps the active area and the second portion overlaps the peripheral area.

3. The electronic device of claim 2, wherein the antenna pattern has a mesh structure.

4. The electronic device of claim 3, wherein:
the first portion includes a first opening,
the second portion includes a second opening, and
a size of the first opening is greater than a size of the second opening.

5. The electronic device of claim 1, further comprising:
a transmission part on which the driving chip is mounted,
wherein the transmission part is bonded to a bottom surface of the cover layer.

6. The electronic device of claim 5, wherein:
the transmission part comprises a second surface facing a first surface,
the first surface has a ground coplanar wave guide (GCPW) structure.

7. The electronic device of claim 6, wherein:
the second surface is bent to face each other, and
the driving chip is on the first surface.

8. The electronic device of claim 1, wherein the driving chip is disposed adjacent to the opening.

9. The electronic device of claim 1, wherein:
an opening is in the antenna pattern, and
at least a portion of the opening in the antenna pattern overlaps the opening in the cover layer.

10. The electronic device of claim 1, wherein the antenna pattern and one or more of the plurality of sensing electrodes are on a common layer.

11. The electronic device of claim 1, further comprising:
an anti-reflection layer on the sensor layer.

12. The electronic device of claim 1, wherein the opening in the cover layer overlaps the active area.

13. The electronic device of claim 1, wherein the driving chip is below the cover layer.

14. The electronic device of claim 13, wherein:
the antenna pattern includes an opening, and
at least a portion of the opening in the antenna pattern overlaps the opening in the cover layer.

15. The electronic device of claim 13, wherein:

the sensor layer comprises a plurality of sensing electrodes, and the antenna pattern and one or more of the plurality of sensing electrodes are on a common layer.

16. The electronic device of claim 13, further comprising:

an anti-reflection layer on the sensor layer.

17. The electronic device of claim 1, wherein the sensor layer and antenna pattern are arranged to be coplanar with one another.

18. An electronic device, comprising:

a display layer including a peripheral area adjacent to an active area, the display layer comprising a second surface facing a first surface;

a sensor layer facing the first surface and comprising an antenna pattern overlapping the active area;

a cover layer facing the second surface and including an opening overlapping the active area; and a driving chip disposed below the cover layer and configured to indirectly supply power to the antenna pattern through the opening.

19. The electronic device of claim 18, wherein the antenna pattern has a mesh structure.

20. The electronic device of claim 18, further comprising:

a transmission part on which the driving chip is mounted, wherein the transmission part is disposed on a bottom surface of the cover layer.

21. The electronic device of claim 20, wherein the transmission part has a ground coplanar wave guide (GCPW) structure.

* * * * *